United States Patent [19]
Mead et al.

[11] Patent Number: 5,488,204
[45] Date of Patent: Jan. 30, 1996

[54] PAINTBRUSH STYLUS FOR CAPACITIVE TOUCH SENSOR PAD

[75] Inventors: Carver A. Mead, Pasadena; Ralph Wolf, Palo Alto; Timothy P. Allen, Los Gatos, all of Calif.

[73] Assignee: Synaptics, Incorporated, San Jose, Calif.

[21] Appl. No.: 324,438

[22] Filed: Oct. 17, 1994

Related U.S. Application Data

[63] Continuation-in-part of Ser. No. 300,630, Sep. 2, 1994, which is a continuation-in-part of Ser. No. 300,387, Sep. 2, 1994, which is a continuation-in-part of Ser. No. 115,743, Aug. 31, 1993, Pat. No. 5,374,787, which is a continuation-in-part of Ser. No. 895,934, Jun. 8, 1992, abandoned.

[51] Int. Cl.$^6$ ................................................ G08C 21/00
[52] U.S. Cl. ........................................ 178/18; 345/179
[58] Field of Search ............................ 178/12, 19, 20, 178/87; 345/173, 174, 175, 179, 180, 181; 341/5; 382/3, 13; 355/27, 266; 395/117, 118, 122

[56] References Cited

U.S. PATENT DOCUMENTS

| | | | |
|---|---|---|---|
| 5,231,450 | 7/1993 | Daniels | 355/27 |
| 5,369,227 | 11/1994 | Stone | 178/18 |
| 5,373,118 | 12/1994 | Uktson | 178/18 X |
| 5,408,593 | 4/1995 | Kotaki et al. | 395/122 |

*Primary Examiner*—Stephen Chin
*Assistant Examiner*—Paul Loomis
*Attorney, Agent, or Firm*—D'Alessandro & Ritchie

[57] ABSTRACT

A proximity sensor system includes a touch-sensor pad with a sensor matrix array having a characteristic capacitance on horizontal and vertical conductors connected to sensor pads. The capacitance changes as a function of the proximity of an object or objects to the sensor matrix. The change in capacitance of each node in both the X and Y directions of the matrix due to the approach of an object is converted to a set of voltages in the X and Y directions. These voltages are processed by circuitry to develop electrical signals representative of the centroid of the profile of the object, i.e, its position in the X and Y dimensions. Noise reduction and background level setting techniques inherently available in the architecture are employed. A conductive paintbrush-type stylus is used to produce paint-like strokes on a display associated with the touch-sensor pad.

11 Claims, 17 Drawing Sheets

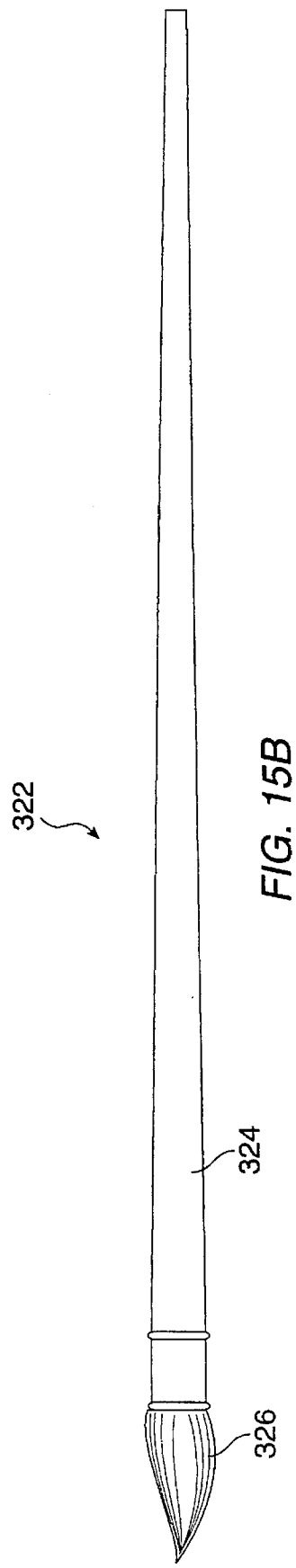

PAINTBRUSH STYLUS FOR CAPACITIVE TOUCH SENSOR PAD

RELATED APPLICATIONS

This application is a continuation in part of co-pending application Ser. No. 08/300,630, filed Sep. 2, 1994, which is a continuation-in-part of application Ser. No. 08/300,387, filed Sep. 2, 1994, which is a continuation-in-part of co-pending application Ser. No. 08/115,743, filed Aug. 31, 1993, now U.S. Pat. No. 5,374,787, which is a continuation-in-part of co-pending application Ser. No. 07/895,934, filed Jun. 8, 1992, now abandoned.

BACKGROUND OF THE INVENTION

1. Field of the Invention

The present invention relates to object position sensing transducers and systems. More particularly, the present invention relates to object position recognition with enhanced edge-motion features useful in applications such as cursor movement for computing devices and other applications, and especially to a paintbrush-like stylus for use with a capacitive touch sensor pad to create brush-like strokes on a display screen.

2. The Prior Art

Numerous devices are available or have been proposed for use as object position detectors for use in computer systems and other applications. The most familiar of such devices is the computer "mouse". While extremely popular as a position indicating device, a mouse has mechanical parts and requires a surface upon which to roll its position ball. Furthermore, a mouse usually needs to be moved over long distances for reasonable resolution. Finally, a mouse requires the user to lift a hand from the keyboard to make the cursor movement, thereby upsetting the prime purpose, which is usually typing on the computer.

Trackball devices are similar to mouse devices. A major difference, however is that, unlike a mouse device, a trackball device does not require a surface across which it must be rolled. Trackball devices are still expensive, have moving parts, and require a relatively heavy touch as do the mouse devices. They are also large in size and do not fit well in a volume-sensitive application like a laptop computer.

There are several available touch-sense technologies which may be employed for use as a position indicator. Resistive-membrane position sensors are known and used in several applications. However, they generally suffer from poor resolution, the sensor surface is exposed to the user and is thus subject to wear. In addition, resistive-membrane touch sensors are relatively expensive. A one-surface approach requires a user to be grounded to the sensor for reliable operation. This cannot be guaranteed in portable computers. An example of a one-surface approach is the UnMouse product by MicroTouch, of Wilmington, Mass. A two-surface approach has poorer resolution and potentially will wear out very quickly in time.

Resistive tablets are taught by U.S. Pat. No. 4,680,430 to Yoshikawa, U.S. Pat. No. 3,497,617 to Ellis and many others. The drawback of all such approaches is the high power consumption and the high cost of the resistive membrane employed.

Surface Acoustic Wave (SAW) devices have potential use as position indicators. However, this sensor technology is expensive and is not sensitive to light touch. In addition, SAW devices are sensitive to residue buildup on the touch surfaces and generally have poor resolution.

Strain gauge or pressure plate approaches are an interesting position sensing technology, but suffer from several drawbacks. This approach may employ piezoelectric transducers. One drawback is that the piezo phenomena is an AC phenomena and may be sensitive to the user's rate of movement. In addition, strain gauge or pressure plate approaches are somewhat expensive because special sensors are required.

Optical approaches are also possible but are somewhat limited for several reasons. All would require light generation which will require external components and increase cost and power drain. For example, a "finger-breaking" infra-red matrix position detector consumes high power and suffers from relatively poor resolution.

There have been numerous attempts to provide a device for sensing the position of a thumb or other finger for use as a pointing device to replace a mouse or trackball. Desirable attributes of such a device are low power, low profile, high resolution, low cost, fast response, and ability to operate reliably when the finger carries electrical noise, or when the touch surface is contaminated with dirt or moisture.

Because of the drawbacks of resistive devices, many attempts have been made to provide pointing capability based on capacitively sensing the position of the finger. U.S. Pat. No. 3,921,166 to Volpe teaches a capacitive matrix in which the finger changes the transcapacitance between row and column electrodes. U.S. Pat. No. 4,103,252 to Bobick employs four oscillating signals to interpolate x and y positions between four capacitive electrodes. U.S. Pat. No. 4,455,452 to Schuyler teaches a capacitive tablet wherein the finger attenuates the capacitive coupling between electrodes.

U.S. Pat. No. 4,550,221 to Mabusth teaches a capacitive tablet wherein the effective capacitance to "virtual ground" is measured by an oscillating signal. Each row or column is polled sequentially, and a rudimentary form of interpolation is applied to resolve the position between two rows or columns. An attempt is made to address the problem of electrical interference by averaging over many cycles of the oscillating waveform. The problem of contamination is addressed by sensing when no finger was present, and applying a periodic calibration during such no-finger-present periods. U.S. Pat. No. 4,639,720 to Rympalski teaches a tablet for sensing the position of a stylus. The stylus alters the transcapacitance coupling between row and column electrodes, which are scanned sequentially. U.S. Pat. No. 4,736,191 to Matzke teaches a radial electrode arrangement under the space bar of a keyboard, to be activated by touching with a thumb. This patent teaches the use of total touch capacitance, as an indication of the touch pressure, to control the velocity of cursor motion. Pulsed sequential polling is employed to address the effects of electrical interference.

U.S. Pat. Nos. 4,686,332 and 5,149,919, to Greanias, teaches a stylus and finger detection system meant to be mounted on a CRT. As a finger detection system, its X/Y sensor matrix is used to locate the two matrix wires carrying the maximum signal. With a coding scheme these two wires uniquely determine the location of the finger position to the resolution of the wire stepping. For stylus detection, Greanias first coarsely locates it, then develops a virtual dipole by driving all lines on one side of the object in one direction and all lines on the opposite side in the opposite direction. This is done three times with different dipole phases and signal polarities. Assuming a predetermined matrix response to the object, the three measurements present a set of simultaneous equations that can be solved for position.

U.S. Pat. No. 4,733,222 to Evans is the first to teach a capacitance touch measurement system that interpolates to a high degree. Evans teaches a three terminal measurement system that uses a drive, sense and electrode signal set (3 signals) in its matrix, and bases the measurement on the attenuation effect of a finger on the electrode node signal (uses a capacitive divider phenomena). Evans sequentially scans through each drive set to measure the capacitance. From the three largest responses an interpolation routine is applied to determine finger position. Evans also teaches a zeroing technique that allows "no-finger" levels to be canceled out as part of the measurement.

U.S. Pat. No. 5,016,008 to Gruaz describes a touch sensitive pad that also uses interpolation. Gruaz uses a drive and sense signal set (2 signals) in the touch matrix and like Evans relies on the attenuation effect of a finger to modulate the drive signal. The touch matrix is sequentially scanned to read the response of each matrix line. An interpolation program then selects the two largest adjacent signals in both dimensions to determine the finger location, and ratiometrically determines the effective position from those four numbers.

Gerpheide, PCT application US90/04584, publication No. W091/03039, U.S. Pat. No. 5,305,017 applies to a touch pad system a variation of the virtual dipole approach of Greanias. Gerpheide teaches the application of an oscillating potential of a given frequency and phase to all electrodes on one side of the virtual dipole, and an oscillating potential of the same frequency and opposite phase to those on the other side. Electronic circuits develop a "balance signal" which is zero when no finger is present, and which has one polarity if a finger is on one side of the center of the virtual dipole, and the opposite polarity if the finger is on the opposite side. To acquire the position of the finger initially, the virtual dipole is scanned sequentially across the tablet. Once the finger is located, it is "tracked" by moving the virtual dipole toward the finger once the finger has moved more than one row or column.

Because the virtual dipole method operates by generating a balance signal that is zero when the capacitance does not vary with distance, it only senses the perimeter of the finger contact area, rather than the entire contact area. Because the method relies on synchronous detection of the exciting signal, it must average for long periods to reject electrical interference, and hence it is slow. The averaging time required by this method, together with the necessity to search sequentially for a new finger contact once a previous contact is lost, makes this method, like those before it, fall short of the requirements for a fast pointing device that is not affected by electrical interference.

It should also be noted that all previous touch pad inventions that used interpolation placed rigorous design requirements on their sensing pad. Greanias and Evans use a complicated and expensive drive, sense and electrode line scheme to develop their signal. Gruaz and Gerpheide use a two signal drive and sense set. In the present invention the driving and sensing is done on the same line. This allows the row and column sections to be symmetric and equivalent. This in turn allows independent calibration of all signal paths, which makes board layout simpler and less constraining, and allows for more unique sensor topologies.

The shortcomings of the inventions and techniques described in the prior art can also be traced to the use of only one set of driving and sensing electronics, which was multiplexed sequentially over the electrodes in the tablet. This arrangement was cost effective in the days of discrete components, and avoided offset and scale differences among circuits.

The sequential scanning approach of previous systems also made them more susceptible to noise. Noise levels could change between successive measurements, thus changing the measured signal and the assumptions used in interpolation routines.

Finally, all previous approaches assumed a particular signal response for finger position versus matrix position. Because the transfer curve is very sensitive to many parameters and is not a smooth linear curve as Greanias and Gerpheide assume, such approaches are limited in the amount of interpolation they can perform.

In prior co-pending application Ser. No. 08/115,743, filed Aug. 31, 1993, now U.S. Pat. No. 5,374,787 a two-dimensional capacitive sensing system equipped with a separate set of drive/sense electronics for each row and for each column of a capacitive tablet is disclosed. All row electrodes are sensed simultaneously, and all column electrodes are sensed simultaneously. The sensed signals are processed by analog circuitry.

Electronic styli for use in "drawing" on touch-pad position sensors are known in the art. Such styli resemble a pencil in appearance and operation. Because of limited ability to sense "pressure" information, a stylus for imitating the action of a paintbrush is not practical using such technology.

It is thus an object of the present invention to provide a two-dimensional capacitive sensing system equipped with a separate set of drive/sense electronics for each row and for each column of a capacitive tablet, wherein all row electrodes are sensed simultaneously, and all column electrodes are sensed simultaneously.

It is a further object of the present invention to provide an electronic system that is sensitive to the entire area of contact of a finger or other conductive object with a capacitive tablet, and to provide as output the coordinates of some measure of the center of this contact area while remaining insensitive to the characteristic profile of the object being detected.

It is a further object of the present invention to provide an electronic system that provides as output some measure of area of contact of a finger or other conductive object with a capacitive tablet.

Yet another object of the present invention is to provide a two-dimensional capacitive sensing system equipped with a separate set of drive/sense electronics for each row and for each column of a capacitive tablet, wherein all row electrodes are sensed simultaneously, and all column electrodes are sensed simultaneously and wherein the information defining the location of a finger or other conductive object is processed in digital form.

It is a further object of the present invention to provide a two-dimensional capacitive sensing system wherein all row electrodes are sensed simultaneously, and all column electrodes are sensed simultaneously and wherein the location of a finger or other conductive object within a peripheral region of a sensing plane can optionally cause cursor "edge motion" on a display screen allowing control of large cursor excursions from a small sensing plane with a single gesture.

Yet another object of the present invention is to provide a two-dimensional capacitive touch sensing system which may be used along with a "paintbrush" type conductive stylus which may be used to "paint" with paintbrush-like strokes on a capacitive touch sensor pad for display on a display screen.

BRIEF DESCRIPTION OF THE INVENTION

With the advent of very high levels of integration, it has become possible to integrate many channels of driving/sensing electronics into one integrated circuit, along with the control logic for operating them, and the interface electronics to allow the pointing device to communicate directly with a host microprocessor. The present invention uses adaptive analog techniques to overcome offset and scale differences between channels, and can thus sense either transcapacitance or self-capacitance of all tablet rows or columns in parallel. This parallel-sensing capability, made possible by providing one set of electronics per row or column, allows the sensing cycle to be extremely short, thus allowing fast response while still maintaining immunity to very high levels of electrical interference.

The present invention comprises a position-sensing technology particularly useful for applications where finger position information is needed, such as in computer "mouse" or trackball environments. However the position-sensing technology of the present invention has much more general application than a computer mouse, because its sensor can detect and report if one or more points are being touched. In addition, the detector can sense the pressure of the touch.

According to a preferred embodiment of the present invention, referred to herein as a "finger pointer" embodiment, a position sensing system includes a position sensing transducer comprising a touch-sensitive surface disposed on a substrate, such as a printed circuit board, including a matrix of conductive lines. A first set of conductive lines runs in a first direction and is insulated from a second set of conductive lines running in a second direction generally perpendicular to the first direction. An insulating layer is disposed over the first and second sets of conductive lines. The insulating layer is thin enough to promote significant capacitive coupling between a finger placed on its surface and the first and second sets of conductive lines.

Sensing electronics respond to the proximity of a finger, conductive object, or an object of high dielectric constant (i.e., greater than about 5) to translate the capacitance changes of the conductors caused by object proximity into digital information which is processed to derive position and touch pressure information. Its output is a simple X, Y and pressure value of the one object on its surface. In all descriptions herein, fingers are to be considered interchangeable with conductive objects and objects of high dielectric constant.

Different prior art pad scan techniques have different advantages in different environments. Parallel drive/sense techniques according to the present invention allow input samples to be taken simultaneously, thus all channels are affected by the same phase of an interfering electrical signal, greatly simplifying the signal processing and noise filtering.

There are two drive/sense methods employed in the touch sensing technology of the present invention. According to a first and presently preferred embodiment of the invention, the voltages on all of the X lines of the sensor matrix are simultaneously moved, while the voltages of the Y lines are held at a constant voltage, with the complete set of sampled points simultaneously giving a profile of the finger in the X dimension. Next, the voltages on all of the Y lines of the sensor matrix are simultaneously moved, while the voltages of the X lines are held at a constant voltage to obtain a complete set of sampled points simultaneously giving a profile of the finger in the other dimension.

According to a second drive/sense method, the voltages on all of the X lines of the sensor matrix are simultaneously moved in a positive direction, while the voltages of the Y lines are moved in a negative direction. Next, the voltages on all of the X lines of the sensor matrix are simultaneously moved in a negative direction, while the voltages of the Y lines are moved in a positive direction. This technique doubles the effect of any transcapacitance between the two dimensions, or conversely, halves the effect of any parasitic capacitance to ground. In both methods, the capacitive information from the sensing process provides a profile of the proximity of the finger to the sensor in each dimension.

As presently preferred, both embodiments then take these profiles and derive a digital value representing the centroid for X and Y position and derive a second digital value for the Z pressure information. The digital information may be directly used by a host computer. Analog processing of the capacitive information may also be used according to the present invention.

The position sensor of these embodiments can only report the position of one object on its sensor surface. If more than one object is present, the position sensor of this embodiment computes the centroid position of the combined set of objects. However, unlike prior art, because the entire pad is being profiled, enough information is available to discern simple multi-finger gestures to allow for a more powerful user interface.

According to another aspect of the present invention, several power reduction techniques which can shut down the circuit between measurements have been integrated into the system. This is possible because the parallel measurement technique according to the present invention is so much faster than prior art techniques.

According to a further aspect of the invention, a variety of noise reduction techniques are integrated into the system.

According to yet another aspect of the present invention, a capacitance measurement technique which is easier to calibrate and implement is employed.

According to another aspect of the present invention, when the presence of a finger or other conductive object is sensed within a defined peripheral region of the sensing plane, the control of cursor motion may be changed to provide "edge motion" to allow control of large cursor excursions on a display screen from a single gesture executed on a small sensing plane.

According to yet a further aspect of the present invention, a paintbrush-like conductive stylus may be employed by a user to "paint" with brush-like strokes on a display screen.

BRIEF DESCRIPTION OF THE DRAWINGS

FIG. 4b is an illustrative schematic diagram of the charge integrator circuit of FIG. 4a.

FIG. 15b is a detailed drawing of a paintbrush stylus suitable for use in the present invention.

DETAILED DESCRIPTION OF A PREFERRED EMBODIMENT

This application is a continuation-in-part of co-pending application Ser. No. 08/300,630 filed Sep. 2, 1994, which is a continuation-in-part of co-pending application Ser. No. 08/115,743, filed Aug. 31, 1993, now U.S. Pat. No. 5,374,787, which is a continuation-in-part of co-pending application Ser. No. 07/895,934, filed Jun. 8, 1992. The present invention continues the approach disclosed in the parent applications and provides more unique features not previously available. These improvements provide a more easily integrated solution, increased sensitivity, and greater noise rejection, increased data acquisition rate and decreased power consumption. The present invention allows for continuous self calibration to subtract out the effects of environmental changes and allows for enhanced cursor control from edge motion on a sensing plane.

Those of ordinary skill in the art will realize that the following description of the present invention is illustrative only and not in any way limiting. Other embodiments of the invention will readily suggest themselves to such skilled persons.

The present invention brings together in combination a number of unique features which allow for new applications not before possible. Because the object position sensor of the present invention has very low power requirements, it is beneficial for use in battery operated or low power applications such as lap top or portable computers. It is also a very low cost solution, has no moving parts (and is therefore virtually maintenance free), and uses the existing printed circuit board traces for sensors. The sensing technology of the present invention can be integrated into a computer motherboard to even further lower its cost in computer applications. Similarly, in other applications the sensor can be part of an already existent circuit board.

Because of its small size and low profile, the sensor technology of the present invention is useful in lap top or portable applications where volume is an important consideration. The sensor technology of the present invention requires circuit board space for only a single sensor interface chip that can interface directly to a microprocessor, plus the area needed on the printed circuit board for sensing.

Figure 1:
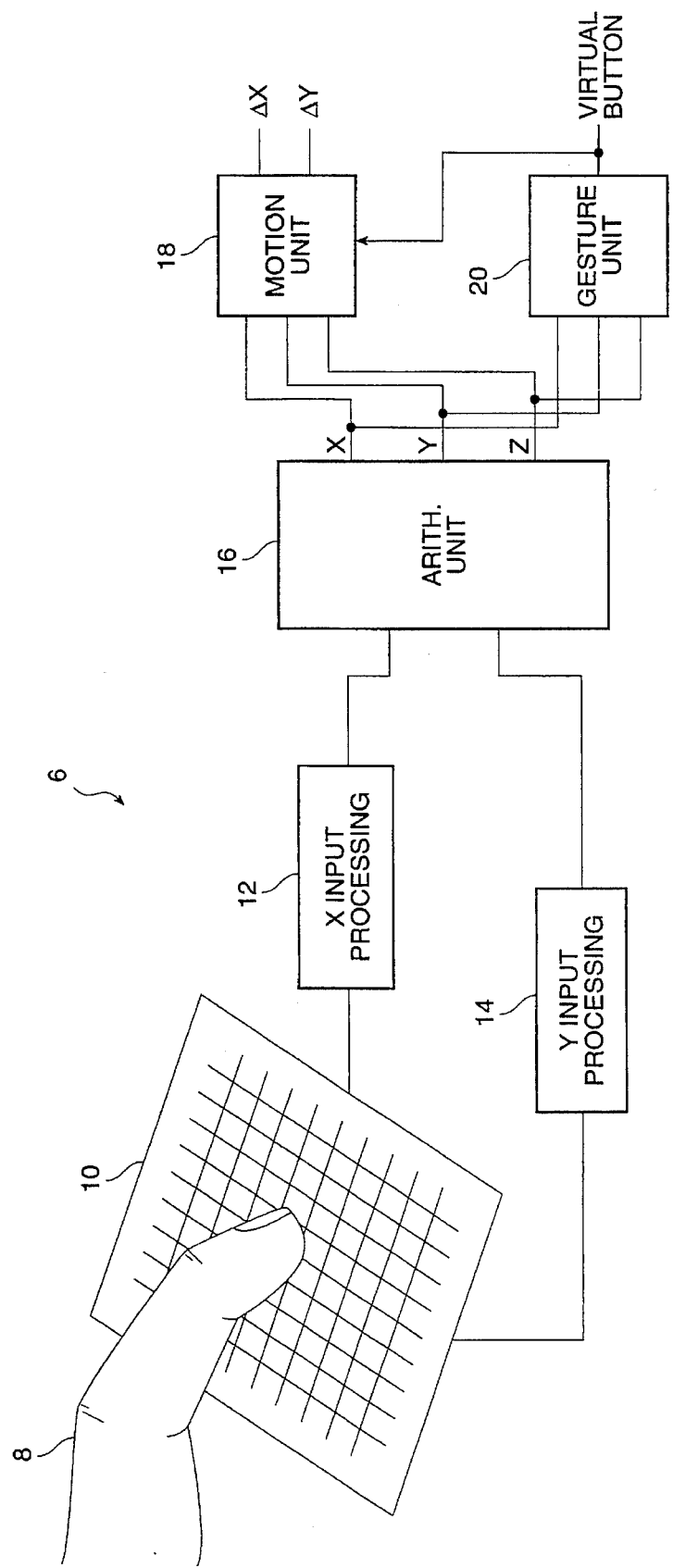
FIG. 1 is an overall block diagram of the capacitive position sensing system of the present invention.
Figure 2A:
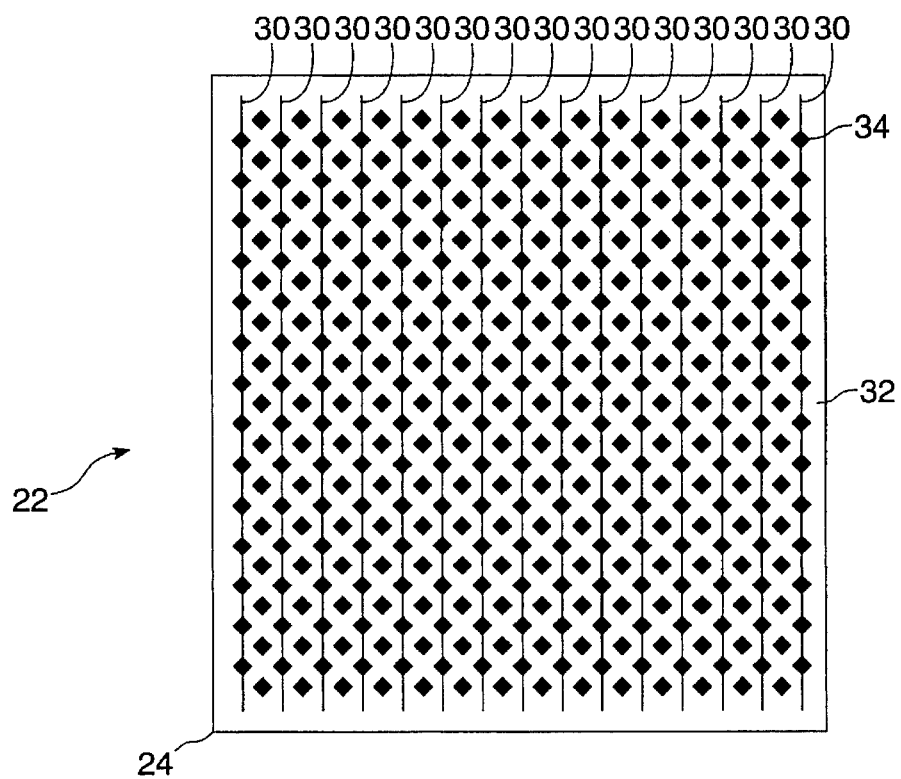
FIG. 2a is a top view of an object position sensor transducer according to a presently preferred embodiment of the invention showing the object position sensor surface layer including a top conductive trace layer and conductive pads connected to a bottom trace layer.
Figure 2B:
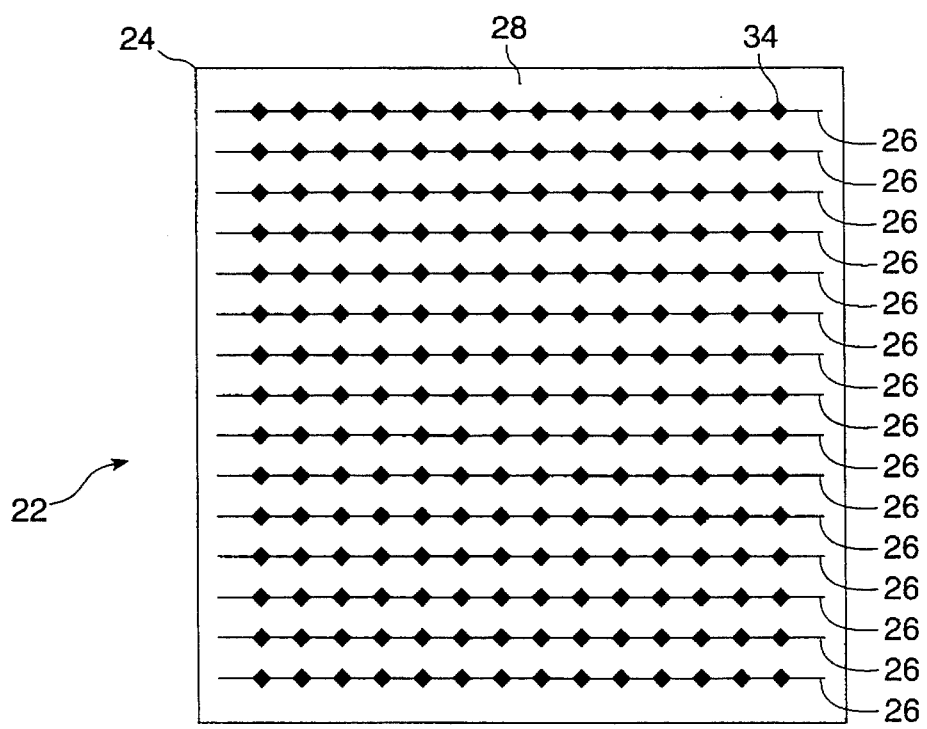
FIG. 2b is a bottom view of the object position sensor transducer of FIG. 2a showing the bottom conductive trace layer.
Figure 2C:
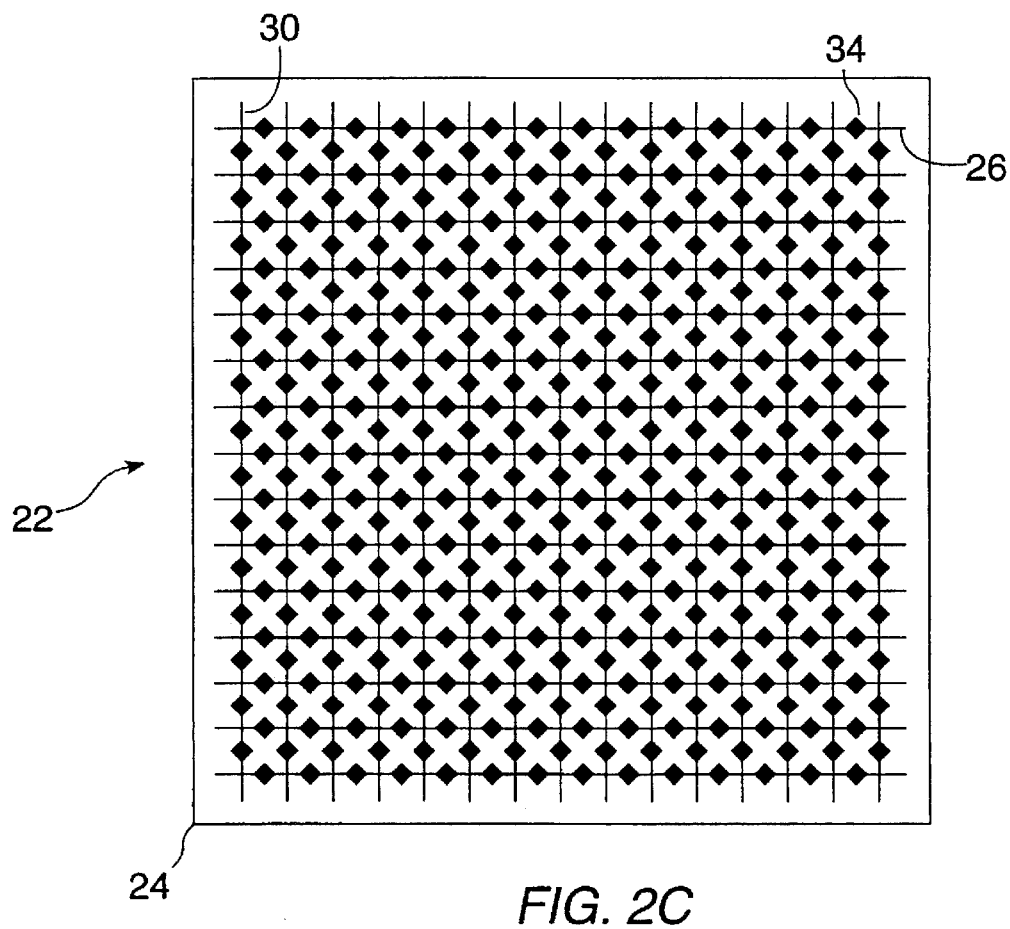
FIG. 2c is a composite view of the object position sensor transducer of FIGS. 2a and 2b showing both the top and bottom conductive trace layers.
Figure 2D:
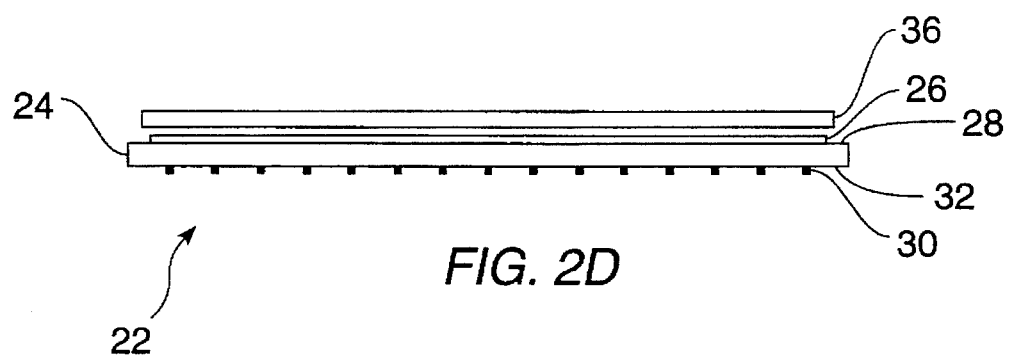
FIG. 2d is a cross-sectional view of the object position sensor transducer of FIGS. 2a–2c.

Referring first to FIG. 1, a simplified block diagram of the capacitive position sensing system 6 of the present invention is presented. Capacitive position sensing system 6 can accurately determine the position of a finger 8 or other conductive object proximate to or touching a sensing plane 10. The capacitance of a plurality of conductive lines running in a first direction (e.g., "X") is sensed by X input processing circuitry 12 and the capacitance of a plurality of conductive lines running in a second direction (e.g., "Y") is sensed by Y input processing circuitry 14. The sensed capacitance values are digitized in both X input processing circuitry 12 and Y input processing circuitry 14. The outputs of X input processing circuitry 12 and Y input processing circuitry 14 are presented to arithmetic unit 16, which uses the digital information to derive digital information representing the position and pressure of the finger 8 or other conductive object relative to the sensing plane 10.

The X, Y, and Z outputs of arithmetic unit 16 are directed to motion unit 18 which provides the cursor motion direction signals to the host computer. The X, Y, and Z outputs of arithmetic unit 16 are also directed to gesture unit 20, which is used to recognize certain finger gestures performed by a user on sensing plane 10. The virtual button output from gesture unit 20 may be used by motion unit 18 to implement some of the functionality of motion unit 18.

The sensor material can be anything that allows creation of a conductive X/Y matrix of pads. This includes not only standard PC boards, but also includes but is not limited to flexible PC boards, conductive elastomer materials, silk-screened conductive lines, and piezo-electric Kynar plastic materials. This renders it useful as well in any portable equipment application or in human interface where the sensor needs to be molded to fit within the hand.

The sensor can be conformed to any three dimensional surface. Copper can be plated in two layers on most any surface contour producing the sensor. This will allow the sensor to be adapted to the best ergonomic form needed for any particular application. This coupled with the "light-touch" feature will make it effortless to use in many applications. The sensor can also be used in an indirect manner, i.e it can have an insulating foam material covered by a conductive layer over the touch sensing surface and be used to detect any object (not just conductive) that presses against it's surface.

Small sensor areas are practical, i.e., a presently conceived embodiment takes about 1.5"×1.5" of area, however those of ordinary skill in the art will recognize that the area is scaleable for different applications. The matrix area is scaleable by either varying the matrix trace spacing or by varying the number of traces. Large sensor areas are practical where more information is needed.

Besides simple X and Y position information, the sensor technology of the present invention also provides finger pressure information. This additional dimension of information may be used by programs to control special features such as "brush-width" modes in Paint programs, special menu accesses, etc., allowing provision of a more natural sensory input to computers. It has also been found useful for implementing "mouse click and drag" modes and for simple input gestures.

The user will not even have to touch the surface to generate the minimum reaction. This feature can greatly minimize user strain and allow for more flexible use.

The sense system of the present invention depends on a transducer device capable of providing position and pressure information regarding the object contacting the transducer. Referring now to FIGS. 2a–2d, top, bottom, composite, and cross-sectional views, respectively, are shown of a presently-preferred sensing plane 10 comprising a touch sensor array 22 for use in the present invention. Since capacitance is exploited by this embodiment of the present invention, the surface of touch sensor array 22 is designed to maximize the capacitive coupling to a finger or other conductive object.

A presently preferred touch sensor array 22 according to the present invention comprises a substrate 24 including a first set of conductive traces 26 disposed on a top surface 28 thereof and run in a first direction to comprise row positions of the touch sensor array 22. A second set of conductive traces 30 are disposed on a bottom surface 32 thereof and run in a second direction preferably orthogonal to the first direction to form the column positions of the touch sensor array 22. The first and second sets of conductive traces 26 and 30 are alternately in contact with periodic sense pads 34 comprising enlarged areas, shown as diamonds in FIGS. 2a–2c. While sense pads 34 are shown as diamonds in FIGS. 2a–2c, any shape, such as circles, which allows them to be closely packed is equivalent for purposes of this invention. As an arbitrary convention herein, the first set of conductive traces 26 will be referred to as being oriented in the "X" or "row" direction and may be referred to herein sometimes as "X lines" and the second set of conductive traces 30 will be referred to as being oriented in the "Y" or "column" direction and may be referred to herein sometimes as "Y lines".

The number and spacing of these sense pads 34 depends upon the resolution desired. For example, in an actual embodiment constructed according to the principles of the present invention, a 0.10 inch center-to-center diamond-shaped pattern of sense pads 34 disposed along a matrix of 15 rows and 15 columns of conductors is employed. Every other sense pad 34 in each direction in the pad pattern is connected to first and second sets of conductive traces 26 and 30 on the top and bottom surfaces 28 and 32, respectively of substrate 24.

Substrate 24 may be a printed circuit board, a flexible circuit board or any of a number of available circuit interconnect technology structures. Its thickness is unimportant as long as contact may be made therethrough from the second set of conductive traces 30 to their sense pads 34 on the top surface 28. The printed circuit board comprising substrate 24 can be constructed using standard industry techniques. Board thickness is not important. Connections from the sense pads 34 to the second set of conductive traces 30 may be made employing standard plated-through hole techniques well known in the printed circuit board art.

In an alternate embodiment of the present invention, the substrate 24 may have a thickness on the order of 0.005 to 0.010 inches. Then the sense pads 34 on the top surface 28 and the plated through holes that connect to the second set of conductive traces 30, can be omitted, further reducing the cost of the system.

An insulating layer 36 is disposed over the sense pads 34 on top surface 28 to insulate a human finger or other object therefrom. Insulating layer 36 is preferably a thin layer (i.e., approximately 5 mils) to keep capacitive coupling large and may comprise a material, such as mylar, chosen for its protective and ergonomic characteristics. The term "significant capacitive coupling" as used herein shall mean capacitive coupling having a magnitude greater than about 0.5 pF.

There are two different capacitive effects taking place when a finger approaches the touch sensor array 22. The first capacitive effect is trans-capacitance, or coupling between sense pads 34, and the second capacitive effect is self-capacitance, or coupling to virtual ground. Sensing circuitry is coupled to the touch sensor array 22 of the present invention and responds to changes in either or both of these capacitances. This is important because the relative sizes of the two capacitances change greatly depending on the user environment. The ability of the present invention to detect changes in both self capacitance and trans-capacitance results in a very versatile system having a wide range of applications.

According to the preferred embodiment of the invention, a position sensor system including touch sensor array 22 and associated position detection circuitry will detect a finger position on a matrix of printed circuit board traces via the capacitive effect of finger proximity to the touch sensor array 22. The position sensor system will report the X, Y position of a finger placed near the touch sensor array 22 to much finer resolution than the spacing between the first and second sets of conductive traces 26 and 30. The position sensor according to this embodiment of the invention will also report a Z value proportional to the outline of that finger and hence indicative of the pressure with which the finger contacts the surface of insulating layer 36 over the touch sensor array 22.

According to the presently preferred embodiment of the invention, a very sensitive, light-touch detector circuit may be provided using adaptive analog and digital VLSI techniques. The circuit of the present invention is very robust and calibrates out process and systematic errors. The detector circuit of the present invention will process the capacitive input information and provide digital information which may be presented directly to a microprocessor.

According to this embodiment of the invention, sensing circuitry is contained on a single sensor processor integrated circuit chip. The sensor processor chip can have any number of X and Y "matrix" inputs. The number of X and Y inputs does not have to be equal. The integrated circuit has a digital bus as output. In the illustrative example disclosed in FIGS. 2a–2d herein, the touch sensor array 22 has 15 traces in both the X and Y directions. The sensor processor chip thus has 15 X inputs and 15 Y inputs. An actual embodiment constructed according to the principles of the present invention employed 18 traces in the X direction and 24 traces in the Y direction. Those of ordinary skill in the art will recognize that the size of the touch sensor array 22 which may be employed in the present invention is arbitrary and will be dictated largely by design choice.

The X and Y matrix nodes are driven and sensed in parallel, with the capacitive information from each line indicating how close a finger is to that node. The scanned information provides a profile of the finger proximity in each dimension. According to this aspect of the present invention, the profile centroid is derived in both the X and Y directions and is the position in that dimension. The profile curve of proximity is also integrated to provide the Z information.

There are two drive and sense methods employed in the touch sensing technology of the present invention. According to a first and presently preferred embodiment of the invention, the voltages on all of the X lines of the touch sensor array 22 are simultaneously moved, while the voltages of the Y lines are held at a constant voltage. Next, the voltages on all of the Y lines of the touch sensor array 22 are simultaneously moved, while the voltages of the X lines are held at a constant voltage. This scanning method accentuates the measurement of capacitance to virtual ground provided by the finger. Those of ordinary skill in the art will recognize that order of these two steps is somewhat arbitrary and may be reversed.

According to a second drive/sense method, the voltages on all of the X lines of the touch sensor array 22 are simultaneously moved in a positive direction, while the voltages of the Y lines are moved in a negative direction. Next, the voltages on all of the X lines of the touch sensor array 22 are simultaneously moved in a negative direction, while the voltages of the Y lines are moved in a positive direction. This second drive/sense method accentuates transcapacitance and de-emphasizes virtual ground capacitance. As with the first drive/sense method, those of ordinary skill in the art will recognize that order of these two steps is somewhat arbitrary and may be reversed.

Figure 3:
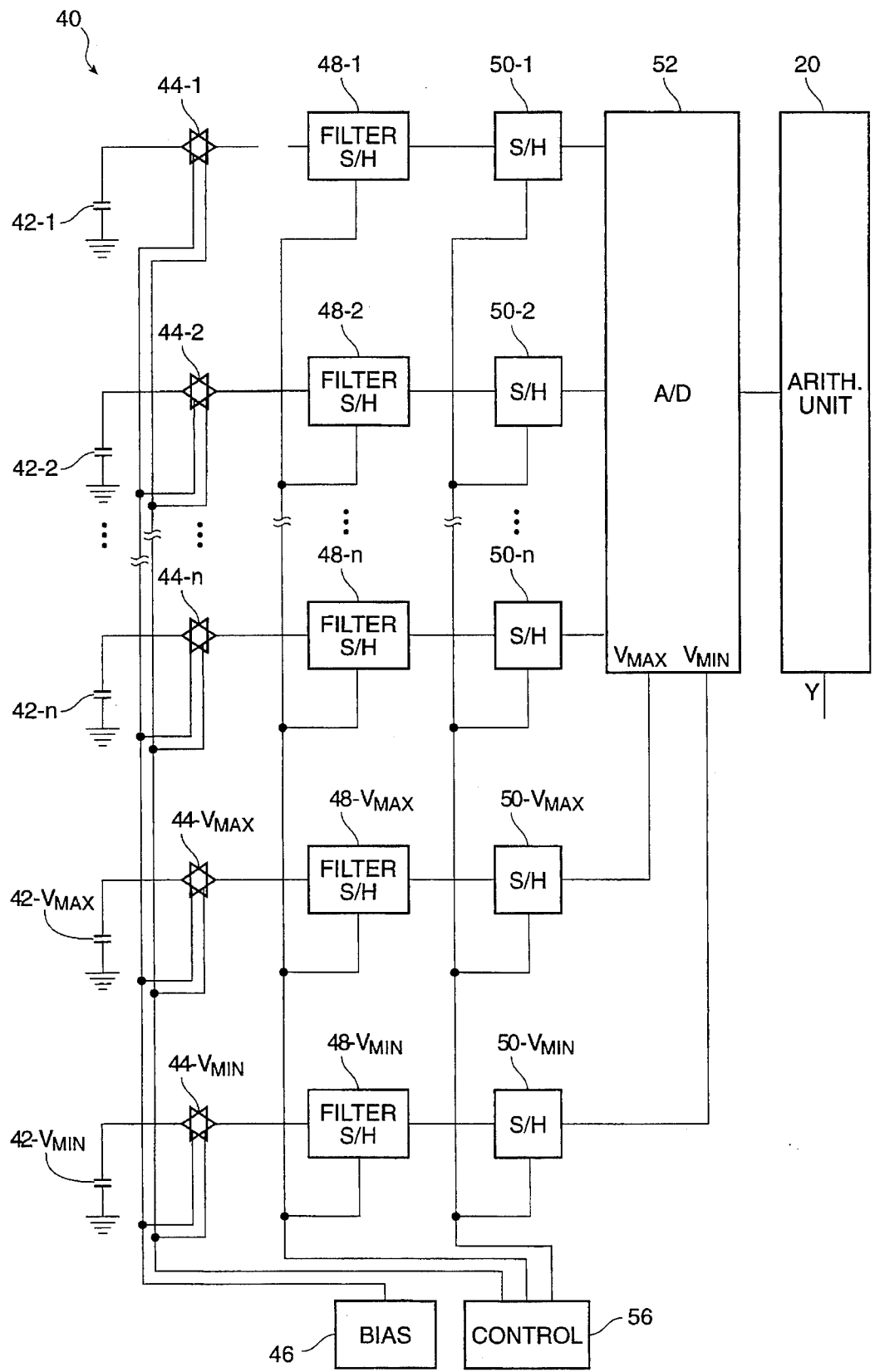
FIG. 3 is a block diagram of sensor decoding electronics which may be used with the sensor transducer in accordance with a preferred embodiment of the present invention.

Referring now to FIG. 3, a block diagram of the presently preferred sensing circuitry 40 for use according to the present invention is presented. This block diagram, and the accompanying disclosure, relates to the sensing circuitry 40 in one dimension (X) only, and includes the X input processing circuitry 12 of FIG. 1. Those of ordinary skill in the art will appreciate that an identical circuit would be used for sensing the opposite (Y) dimension and would include the Y input processing circuitry 14 of FIG. 1. Such skilled persons will further note that the two dimensions do not need to be orthogonal to one another. For example, they can be radial or of any other nature to match the contour of the touch sensor array 22 and other needs of the system. Those of ordinary skill in the art will recognize that the technology disclosed herein could be applied as well to a one-dimensional case where only one set of conductive traces is used.

The capacitance at each touch sensor array 22 node is represented by equivalent capacitors 42-1 through 42-n. The capacitance of capacitors 42-1 through 42-n comprises the capacitance of the matrix conductors and has a characteristic background value when no object (e.g., a finger) is proximate to the sensing plane 10 of the touch sensor array 22. As an object approaches the sensing plane 10 the capacitance of capacitors 42-1 through 42-n increases in proportion to the size and proximity of the object.

According to the present invention, the capacitance at each touch sensor array 22 node is measured simultaneously using charge integrator circuits 44-1 through 44-n. Charge-integrator circuits 44-1 through 44-n serve to inject charge into the capacitances 42-1 through 42-n, respectively, and to develop an output voltage proportional to the capacitance sensed on the corresponding X matrix line. Thus charge-integrator circuits 44-1 through 44-n are shown as bidirectional amplifier symbols. Each charge-integrator circuit 44-1 through 44-n is supplied with an operating bias voltage by bias-voltage generating circuit 46.

As used herein, the phrase "proportional to the capacitance" means that the voltage signal generated is a monotonic function of the sensed capacitance. In the embodiment described herein, the voltage is directly and linearly proportional to the capacitance sensed. Those of ordinary skill in the art will recognize that other monotonic functions, including but not limited to inverse proportionality, and non-linear proportionality such as logarithmic or exponential functions, could be employed in the present invention without departing from the principles disclosed herein. In addition current-sensing as well as voltage-sensing techniques could be employed.

According to a presently preferred drive/sense method used in the present invention, the capacitance measurements are performed simultaneously across all inputs in one dimension to overcome a problem which is inherent in all prior art approaches that scan individual inputs. The problem with the prior-art approach is that it is sensitive to high frequency and large amplitude noise (large dv/dt noise) that is coupled to the circuit via the touching object. Such noise may distort the finger profile because of noise appearing in a later scan cycle but not an earlier one, due to a change in the noise level.

The present invention overcomes this problem by "taking a snapshot" of all inputs simultaneously in X and then Y directions (or visa versa). Because the injected noise is proportional to the finger signal strength across all inputs, it is therefore symmetric around the finger centroid. Because it is symmetric around the finger centroid it does not affect the finger position. Additionally, the charge amplifier performs a differential measuring function to further reject common-mode noise.

Because of the nature of the charge integrator circuits 44-1 through 44-n, their outputs will be changing over time and will have the desired voltage output for only a short time. As presently preferred, filter circuits 48-1 through 48-n are implemented as sample and hold switched capacitor filters.

The desired voltage is captured by the filter circuits 48-1 through 48-n. As controlled by control circuitry 56, the filter circuits 48-1 through 48-n will filter out any high frequency noise from the sensed signal. This is accomplished by choosing the capacitor for the filter to be much larger than the output capacitance of charge integrator circuits 44-1 through 44-n. In addition, those of ordinary skill in the art will recognize that the switched capacitor filter circuits 48-1 through 48-n will capture the desired voltages and store them.

According to the present invention, the capacitance information obtained in voltage form from the capacitance measurements is digitized and processed in digital format. Accordingly, the voltages stored by filter circuits 48-1 through 48-n are stored in sample/hold circuits 50-1 through 50-n so that the remainder of the circuitry processes input data taken at the same time. Sample/hold circuits 50-1 through 50-n may be configured as conventional sample/hold circuits as is well known in the art.

The sampled analog voltages at the outputs of sample/hold circuits 50-1 through 50-n are digitized by analog-to-digital (A/D) converters 52. As presently preferred, A/D converters 52 resolve the input voltage to a 10-bit wide digital signal (a resolution of one part in 1,024), although those of ordinary skill in the art will realize that other resolutions may be employed. A/D converters 52 may be conventional successive approximation type converters as is known in the art.

Given the charge integrator circuits 44 employed in the present invention, the background level (no object present) of the charge integrator circuits 44 outputs will be about 1 volt. The ΔV resulting from the presence of a finger or other object will typically be about 0.4 volt. The voltage range of the A/D converters 52 should therefore be in the range of between about 1–2 volts.

An important consideration is the minimum and maximum voltage reference points for the A/D converters 52 ($V_{min}$ and $V_{max}$). It has been found that noise will cause position jitter if these reference voltages are fixed points. A solution to this problem which is employed in the present invention is to dynamically generate the $V_{min}$ and $V_{max}$ reference voltages from reference capacitances 42-Vmin and 42-Vmax, sensed by charge integrator circuits 44-Vmin and 44-Vmax and processed by filter circuits 48-Vmin and 48-Vmax and stored in sample/hold circuits 50-Vmin and 50-Vmax. In this manner, any common mode noise present when the signals are sampled from the touch sensor array 22 will also be present in the $V_{min}$ and $V_{max}$ reference voltage values and will tend to cancel. Those of ordinary skill in the art will realize that reference capacitances 42-Vmin and 42-Vmax may either be discrete capacitors or extra traces in the touch sensor array 22.

According to the present invention, the $V_{min}$ reference voltage is generated from a capacitor having a value equal to the lowest capacitance expected to be encountered in the touch sensor array 22 with no object present (about 12 pF assuming a 2 inch square sensor array). The $V_{max}$ reference voltage is generated from a capacitor having a value equal to the largest capacitance expected to be encountered in the touch sensor array 22 with an object present (about 16 pF assuming a 2 inch square sensor array).

The outputs of A/D converters 52 provide inputs to arithmetic unit 16. As will be more fully disclosed with reference to FIG. 8, the function of arithmetic unit 16 is to compute the weighted average of the signals on the individual sense lines in both the X and Y directions in the touch sensor array 22. Thus, arithmetic unit 16 is shared by the X input processing circuitry 12 and the Y input processing circuitry 14 as shown in FIG. 1.

Control circuitry 56 of FIG. 3 orchestrates the operation of the remainder of the circuitry. Because the system is discretely sampled and pipelined in its operation, control circuitry 56 is present to manage the signal flow. The functions performed by control circuitry 56 may be conventionally developed via what is commonly known in the art as a state machine or microcontroller.

Figure 4A:
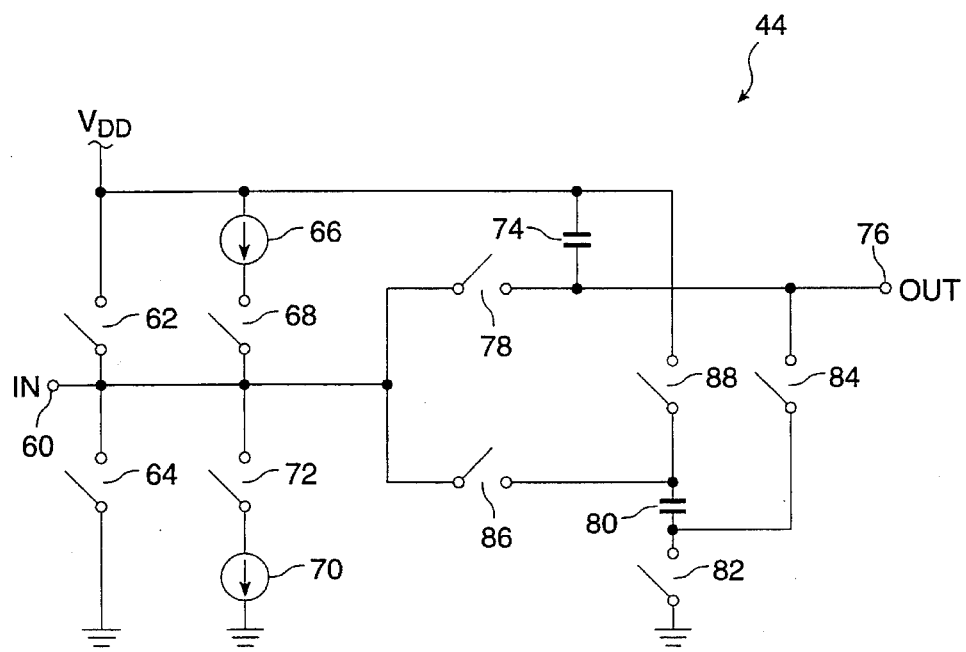
FIG. 4a is a simplified schematic diagram of a charge integrator circuit which may be used in the present invention.
Figure 4B:
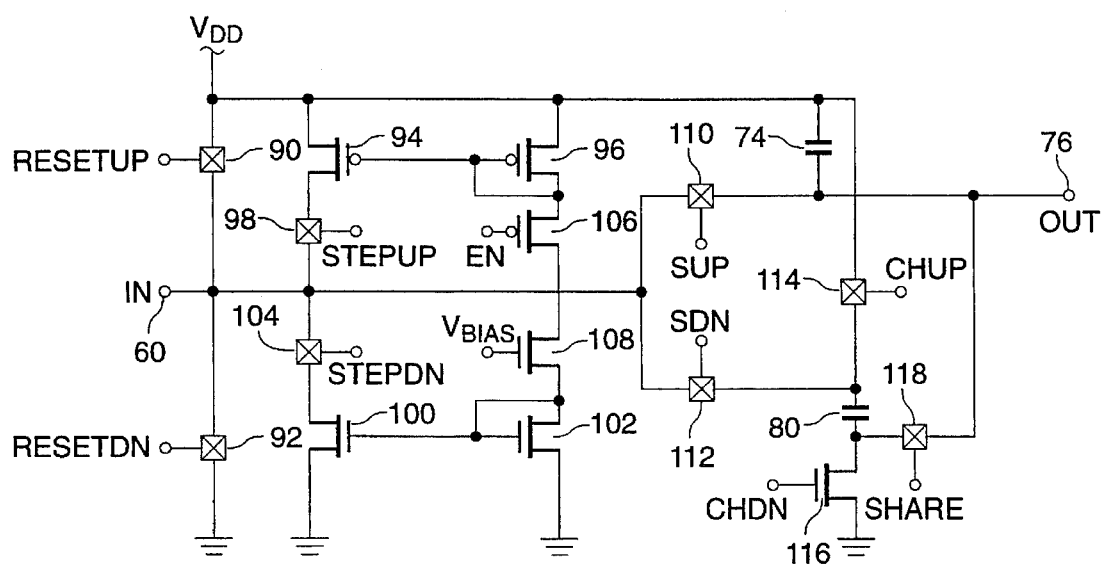
Figure 5:
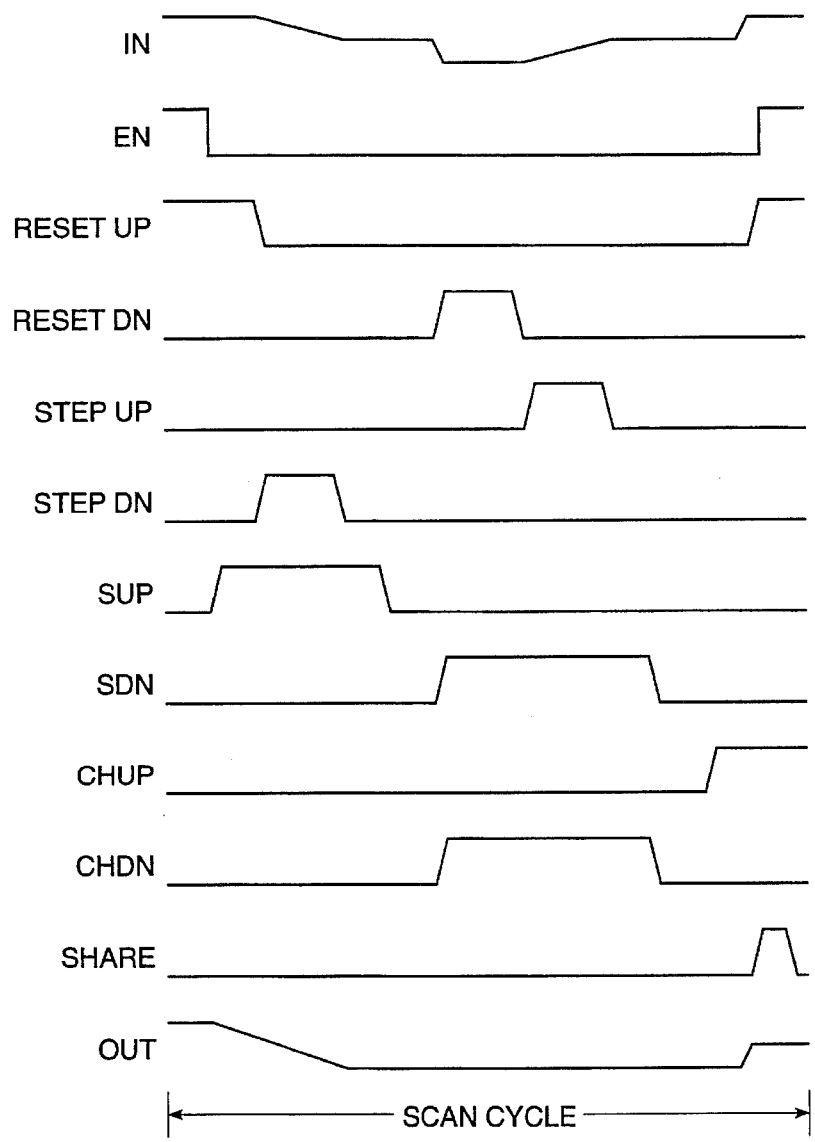
FIG. 5 is a timing diagram of the operation of charge integrator circuit of FIGS. 4a and 4b.

The structure and operation of the individual blocks of FIG. 3 will now be disclosed. Referring now to FIGS. 4a, 4b, and 5, a typical charge integrator circuit 44 will be described. Charge integrator circuit 44 is shown as a simplified schematic diagram in FIG. 4a and as an illustrative schematic diagram in FIG. 4b. The timing of the operation of charge integrator circuit 44 is shown in FIG. 5. These timing signals are provided by the controller circuitry 56.

Charge integrator circuit 44 is based on the fundamental physical phenomena of using a current to charge a capacitor. If the capacitor is charged for a constant time by a constant current, then a voltage will be produced on the capacitor which is inversely proportional to the capacitance. The capacitance to be charged is the sensor array line capacitance 42 in parallel with an internal capacitor. This internal capacitor will contain the voltage of interest.

Referring now to FIG. 4a, a simplified schematic diagram of an illustrative charge integrator circuit 44 is shown. A charge integrator circuit input node 60 is connected to one of the X (or Y) lines of the touch sensor array 22. A first shorting switch 62 is connected between the charge integrator circuit input node 60 and $V_{DD}$, the positive supply rail. A second shorting switch 64 is connected between the charge integrator circuit input node 60 and ground, the negative supply rail. A positive constant current source 66 is connected to $V_{DD}$, the positive supply rail and to the charge integrator circuit input node 60 and through a first current source switch 68. A negative constant current source 70 is connected to ground and to the charge integrator circuit input node 60 and through a second current source switch 72. It is obvious that other high and low voltage rails could be used in place of $V_{DD}$ and ground.

A first internal capacitor 74 is connected between $V_{DD}$ and output node 76 of charge integrator circuit 44. A positive voltage storage switch 78 is connected between output node 76 and input node 60. A second internal capacitor 80 has one of its plates connected to ground through a switch 82 and to output node 76 of charge integrator circuit 44 through a switch 84, and the other one of its plates connected to input node 60 through a negative voltage storage switch 86 and to $V_{DD}$ through a switch 88. The capacitance of first and second internal capacitors 74 and 80 should be a small fraction (i.e., about 10%) of the capacitance of the individual sensor array lines. In a typical embodiment, the sensor array line capacitance will be about 10 pF and the capacitance of capacitors 74 and 80 should be about 1 pF.

According to the presently preferred embodiment of the invention, the approach used is a differential measurement for added noise immunity, the benefit of which is that any low frequency common mode noise gets subtracted out. For the following discussion, it is to be assumed that all switches are open unless they are noted as closed. First, the sensor array line is momentarily shorted to $V_{DD}$ through switch 62, switch 78 is closed connecting capacitor 74 in parallel with the capacitance of the sensor line. Then the parallel capacitor combination is discharged with a constant current from current source 70 through switch 72 for a fixed time period. At the end of the fixed time period, switch 78 is opened, thus storing the voltage on the sensor array line on capacitor 74.

The sensor line is then momentarily shorted to ground through switch 64, and switches 82 and 86 are closed to place capacitor 80 in parallel with the capacitance of the sensor line. Switch 68 is closed and the parallel capacitor combination is charged with a constant current from current source 66 for a fixed time period equal to the fixed time period of the first cycle. At the end of the fixed time period, switch 86 is opened, thus storing the voltage on the sensor matrix line on capacitor 80.

The first and second measured voltages are then averaged. This is accomplished by opening switch 82 and closing switches 88 and 84, which places capacitor 80 in parallel with capacitor 74. Because capacitors 74 and 80 have the same capacitance, the resulting voltage across them is equal to the average of the voltages across each individually. This final result is the value that is then passed on to the appropriate one of filter circuits 48-1 through 48-n.

The low frequency noise, notably 50/60 Hz and their harmonics, behaves as a DC current component that adds in one measurement and subtracts in the other. When the two results are added together that noise component averages to zero. The amount of noise rejection is a function of how quickly in succession the two opposing charge-up and charge-down cycles are performed as will be disclosed herein. One of the reasons for the choice of this charge integrator circuit 44 is that it allows measurements to be taken quickly.

Referring now to FIG. 4b, a more complete schematic diagram of an illustrative embodiment of charge integrator circuit 44 of the simplified diagram of FIG. 4a is shown. Input node 60 is shown connected to $V_{DD}$ and ground through pass gates 90 and 92, which replace switches 62 and 64 of FIG. 4a. Pass gate 90 is controlled by a signal ResetUp presented to its control input and pass gate 92 is controlled by a signal ResetDn presented to its control input. Those of ordinary skill in the art will recognize that pass gates 90 and 92, as well as all of the other pass gates which are represented by the same symbol in FIG. 4b may be conventional CMOS pass gates as are known in the art. The convention used herein is that the pass gate will be off when its control input is held low and will be on and present a low impedance connection when its control input is held high.

P-Channel MOS transistors 94 and 96 are configured as a current mirror. P-Channel MOS transistor 94 serves as the current source 66 and pass gate 98 serves as switch 68 of FIG. 4a. The control input of pass gate 98 is controlled by a signal StepUp.

N-Channel MOS transistors 100 and 102 are also configured as a current mirror. N-Channel MOS transistor 100 serves as the current source 70 and pass gate 104 serves as switch 72 of FIG. 4a. The control input of pass gate 104 is controlled by a signal StepDn. P-Channel MOS transistor 106 and N-Channel MOS transistor 108 are placed in series with P-Channel MOS current mirror transistor 96 and N-Channel MOS current mirror transistor 102. The control gate of P-Channel MOS transistor 106 is driven by an enable signal EN, which turns on P-Channel M©S transistor 106 to energize the current mirrors. This device is used as a power conservation device so that the charge integrator circuit 44 may be turned off to conserve power when it is not in use.

N-Channel MOS transistor 108 has its gate driven by a reference voltage Vbias, which sets the current through current mirror transistors 96 and 108. The voltage Vbias is set by a servo feedback circuit as will be disclosed in more detail with reference to FIG. 10. Those of ordinary skill in the art will appreciate that this embodiment allows calibration to occur in real time (via long time constant feedback) thereby zeroing out any long term effects due to sensor environmental changes. In a current embodiment of the invention, Vbias is common for all charge integrator circuits 44-1 through 44-n and 44-Vmax and 44-Vmin.

Note that proper sizing of N-Channel MOS transistors 102 and 108 may provide temperature compensation. This is accomplished by taking advantage of the fact that the threshold of N-Channel MOS transistor 108 reduces with temperature while the mobility of both N-Channel MOS transistors 102 and 108 reduce with temperature. The threshold reduction has the effect of increasing the current while the mobility reduction has the effect of decreasing the current. By proper device sizing these effects can cancel each other out over a significant part of the operating range.

Capacitor 74 has one plate connected to $V_{DD}$ and the other plate connected to the output node 76 and to the input node 60 through pass gate 110, shown as switch 78 in FIG. 4a. The control input of pass gate 110 is driven by the control signal SUp. One plate of capacitor 80 is connected to input node 60 through pass gate 112 (switch 86 in FIG. 4a) and to VDD through pass gate 114 (switch 82 in FIG. 4a). The control input of pass gate 112 is driven by the control signal SDn and the control input of pass gate 114 is driven by the control signal ChUp. The other plate of capacitor 80 is connected to ground through N-Channel MOS transistor 116 (switch 82 in FIG. 4a) and to output node 76 through pass gate 118 (switch 84 in FIG. 4a). The control input of pass gate 118 is driven by control signal Share.

Referring now to FIGS. 4a, 4b and the timing diagram of FIG. 5, the operation of charge integrator circuit 44 during one scan cycle may be observed. First the EN (enable) control signal goes active by going to 0v. This turns on the current mirrors and energizes the charge and discharge current sources, P-Channel and N-Channel MOS transistors 94 and 100. The ResetUp control signal is active high at this time, which shorts the input node 60 (and the sensor line to which it is connected) to $V_{DD}$. The SUp control signal is also active high at this time which connects capacitor 74 and the output node 76 to input node 60. This arrangement guarantees that the following discharge portion of the operating cycle always starts from a known equilibrium state.

The discharge process starts after ResetUp control signal goes inactive. The StepDn control signal goes active, connecting N-Channel MOS transistor 100, the discharge current source, to the input node 60 and its associated sensor line. StepDn is active for a set amount of time, and the negative constant current source discharges the combined capacitance of the sensor line and capacitor 74 thus lowering its voltage during that time. StepDn is then turned off. A short time later the SUp control signal goes inactive, storing the measured voltage on capacitor 74. That ends the discharge cycle.

Next, the ResetDn control signal becomes active and shorts the sensor line to ground. Simultaneously the SDn and ChDn control signals become active and connect capacitor 80 between ground and the sensor line. Capacitor 80 is discharged to ground, guaranteeing that the following charge up cycle always starts from a known state.

The charge up cycle starts after ResetDn control signal becomes inactive and the StepUp control signal becomes active. At this point the current charging source, P-Channel MOS transistor 94, is connected to the sensor line and supplies a constant current to charge the sensor line by increasing the voltage thereon. The StepUp control signal is active for a set amount of time (preferably equal to the time for the previously mentioned cycle) allowing the capacitance to charge, and then it is turned off. The SDn control signal then goes inactive, leaving the measured voltage across capacitor 80.

The averaging cycle now starts. First the voltage on capacitor 80 is level shifted. This is done by the ChDn control signal going inactive, letting one plate of the capacitor 80 float. Then the ChUp control signal goes active, connecting the second plate of the capacitor 80 to $V_{DD}$. Then the Share control signal becomes active which connects the first plate of capacitor 80 to output node 76, thus placing capacitors 74 and 80 in parallel. This has the effect of averaging the voltages across the two capacitors 74 and 80, thus subtracting out common-mode noise as previously described. This average voltage is also then available on output node 76.

Those of ordinary skill in the art will recognize that the environmental alternating current and other low frequency noise-canceling feature inherent in the averaging of the voltages obtained in the discharge and charge cycles is most effective when the two cycles are performed very close together in time. According to the present invention, the ChDn and ChUp signals should be asserted with respect to each other within a time period much less than a quarter of the period of the noise to be canceled in order to take advantage of this feature of the present invention.

According to the present invention, two different drive/sense methods have been disclosed. Those of ordinary skill in the art will readily observe that the charge integrator circuit 44 disclosed with reference to FIGS. 4a, 4b, and 5 is adaptable to operate according to either scanning method disclosed herein.

Figure 6:
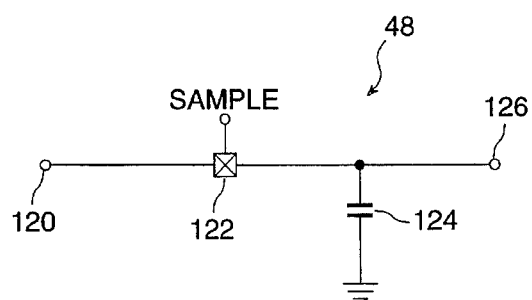
FIG. 6 is a schematic diagram of an illustrative filter and sample/hold circuit for use in the present invention.

As is clear from an understanding of the operation of charge integrator circuit 44, its output voltage is only available for a short period of time and is subject to environmental noise. In order to minimize the effects of noise, a switched capacitor filter circuit 48 is used. Referring now to FIG. 6, a schematic diagram of an illustrative switched capacitor filter circuit 48 which may be used in the present invention is shown. Those of ordinary skill in the art will recognize this switched capacitor filter circuit, which comprises an input node 120, a pass gate 122 having a control input driven by a Sample control signal, a capacitor 124 connected between the output of the pass gate 126 and a fixed voltage such as ground, and an output node comprising the common connection between the capacitor 124 and the output of the pass gate 126. In a typical embodiment, capacitor 124 will have a capacitance of about 10 pF.

As will be appreciated by persons of ordinary skill in the art, the switched capacitor filter circuit 48 is in part a sample/hold circuit and has a filter time constant which is K times the period of sample, where K is the ratio of capacitor 124 to the sum of capacitors 74 and 80 of the charge integrator circuit 44 of FIGS. 4a and 4b to which it is connected. The switched capacitor filter circuit 48 further reduces noise injection in the system. In the preferred embodiment, K=10/2= 5. Those of ordinary skill in the art will recognize that other types of filter circuits, such as RC filters, may be employed in the present invention.

Figure 7:
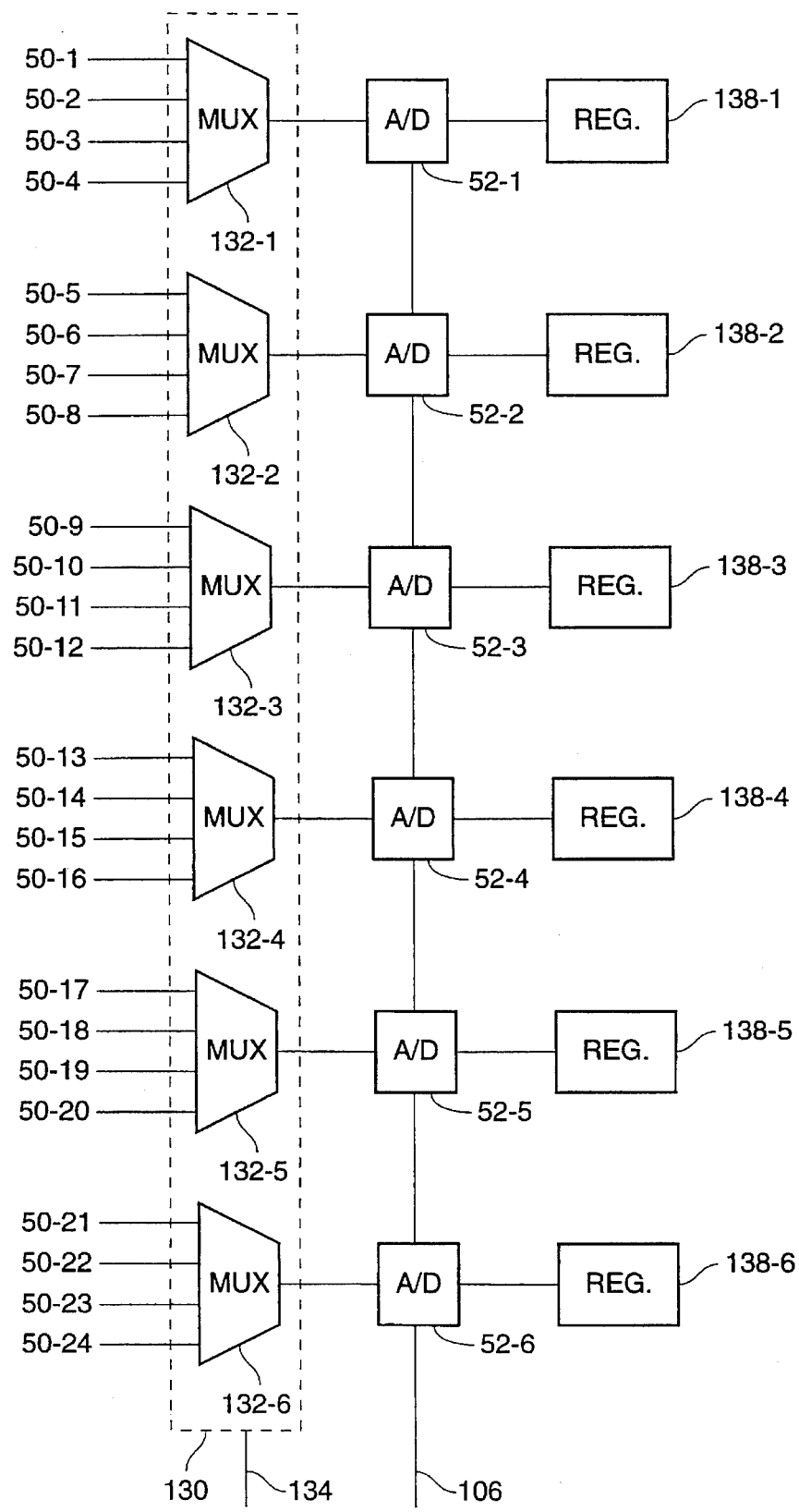
FIG. 7 is a more detailed block diagram of a presently preferred arrangement of A/D converters for use in the present invention.

Referring now to FIG. 7, a more detailed block diagram of a presently preferred arrangement of A/D converters 52 of FIG. 3 is presented. There are fewer A/D converters 52 than there are lines in the touch sensor array 22, and the inputs to the A/D converters 52 are multiplexed to share each of the individual A/D converters 52 among several lines in the touch sensor array 22. The arrangement in FIG. 7 is more efficient in the use of integrated circuit layout area than providing individual A/D converters 52 for each input line.

In the embodiment illustrated in FIG. 7, twenty-four conductive line traces are assumed for the touch sensor array 22 of FIGS. 2a–2d. As shown in FIG. 7, the outputs of sample/hold circuits 50-1 through 50-24 are fed to the analog data inputs of analog multiplexer 130. Analog multiplexer 130 has six outputs, each of which drives the input of an individual A/D converter 52-1 through 52-6. The internal arrangement of analog multiplexer 130 is such that four different ones of the inputs are multiplexed to each of the outputs. Analog multiplexer 130 has been conceptually drawn as six internal multiplexer blocks 132-1 through 132-6.

In the example shown in FIG. 7, inputs taken from sample/hold circuits 50-1 through 50-4 are multiplexed to the output of internal multiplexer block 132-1 which drives A/D converter 52-1. Similarly, inputs taken from sample/hold circuits 50-5 through 50-8 are multiplexed to the output of internal multiplexer block 132-2 which drives A/D converter 52-2; inputs taken from sample/hold circuits 50-9 through 50-12 are multiplexed to the output of internal multiplexer block 132-3 which drives A/D converter 52-3; inputs taken from sample/hold circuits 50-13 through 50-16 are multiplexed to the output of internal multiplexer block 132-4 which drives A/D converter 52-4; inputs taken from sample/hold circuits 50-17 through 50-20 are multiplexed to the output of internal multiplexer block 132-5 which drives A/D converter 52-5; and inputs taken from sample/hold circuits 50-21 through 50-24 are multiplexed to the output of internal multiplexer block 132-6 which drives A/D converter 52-6.

Analog multiplexer 130 has a set of control inputs schematically represented by bus 134. In the illustrative embodiment shown in FIG. 7, each of internal multiplexers 132-1 through 132-6 are four-input multiplexers and thus control bus 134 may comprise a two-bit bus for a one-of-four selection. Those of ordinary skill in the art will recognize that the arrangement of FIG. 7 is merely one of a number of specific solutions to the task of A/D conversion from twenty-four channels, and that other satisfactory equivalent arrangements are possible.

In a straightforward decoding scheme, multiplexers 132-1 through 132-6 will pass, in sequence, the analog voltages present on their first through fourth inputs on to the inputs of A/D converters 52-1 through 52-6 respectively. After the analog values have settled in the inputs of A/D converters 52-1 through 52-6, a CONVERT command is asserted on common A/D control line 136 to begin the A/D conversion process.

When the A/D conversion process is complete, the digital value representing the input voltage is stored in registers 138-1 through 138-6. As presently preferred, registers 138-1 through 138-6 may each comprise a two-word register, so that one word may be read out of the registers 138-1 through 138-6 to arithmetic unit 16 while a second word is being written into the registers 138-1 through 138-6 in order to maximize the speed of the system. The design of such registers 138-1 through 138-6 is conventional in the art.

Figure 8:
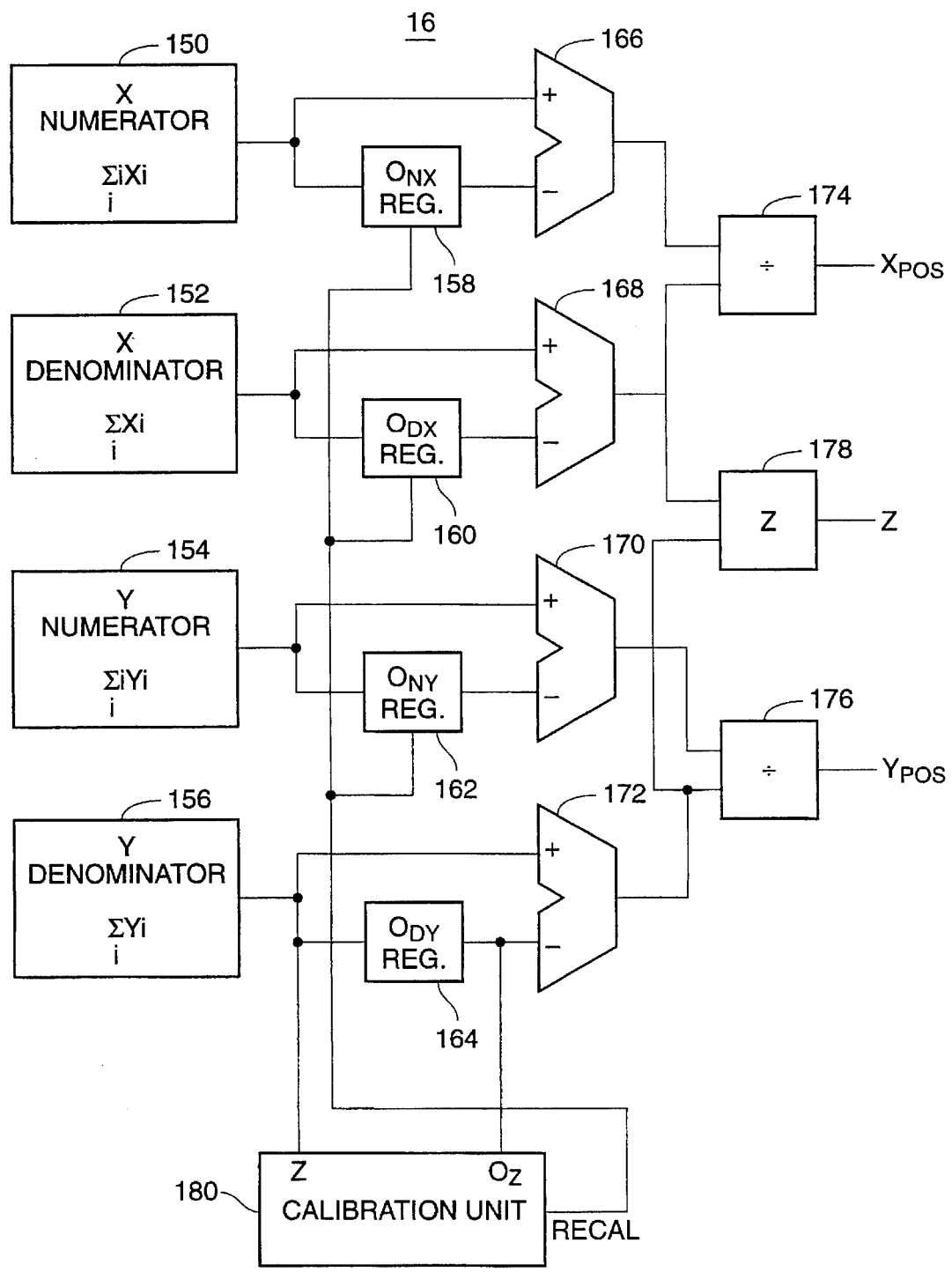
FIG. 8 is a block diagram of an illustrative arithmetic unit which may be used in the present invention.

Referring now to FIG. 8, a more detailed block diagram of the arithmetic unit 16 is presented. Those of ordinary skill in the art will appreciate that arithmetic unit 16 processes information from both the X and Y dimensions, i.e., from X input processing circuit 12 and Y input processing circuit 14 of FIG. 1.

Before disclosing the structural configuration of arithmetic unit 16, it is helpful to understand the preferred method by which the centroid position of an object proximate to the touch sensor array 22 is determined according to the present invention.

According to a presently preferred embodiment of the invention, the object position in either direction may be determined by evaluating the weighted average of the capacitances measured on the individual sense line of the touch sensor array 22. In the following discussion, the X direction is used, but those of ordinary skill in the art will recognize that the discussion applies to the determination of the weighted average in the Y direction as well. As is well known, the weighted average may be determined as follows:

$$X \text{ position} = \frac{\sum_{i=0}^{n} i \times \Delta C_i}{\sum_{i=0}^{n} \Delta C_i} \quad \text{[Eq. 1]}$$

where $\Delta C_i = C_i - CO_i$. $C_i$ is the capacitance presently being measured on the ith trace and $CO_i$ is the value measured on that same trace at some past time when no object was present. In terms of these past and present capacitance measurements, the position can be expressed as:

$$X \text{ position} = \frac{\sum_{i=0}^{n} i \times (C_i - CO_i)}{\sum_{i=0}^{n} (C_i - CO_i)} \quad \text{[Eq. 2]}$$

Using the distributive property of multiplication over addition, this expression is seen to be equivalent to:

$$X \text{ position} = \frac{-\sum_{i=0}^{n} (i \times CO_i) + \sum_{i=0}^{n} (i \times C_i)}{-\sum_{i=0}^{n} (CO_i) + \sum_{i=0}^{n} (C_i)} \quad \text{[Eq. 3]}$$

where the negative terms in both the numerator and denominator are offsets and represent the background value of the capacitances with no object present. If the term $O_N$ is used to represent the numerator offset and the term $O_D$ is used to represent the denominator offset, Eq. 3 may be re-written as:

$$X \text{ position} = \frac{-O_N + \sum_{i=0}^{n} (i \times C_i)}{-O_D + \sum_{i=0}^{n} (C_i)} \quad \text{[Eq. 4]}$$

Referring now to FIG. 8, it may be seen that arithmetic unit 16 includes X numerator and denominator accumulators 150 and 152 and Y numerator and denominator accumulators 154 and 156. The source of operand data for X numerator and denominator accumulators 150 and 152 and Y numerator and denominator accumulators 154 and 156 are the registers 138-1 through 138-6 in each (X and Y) direction of the touch sensor array 22 of FIG. 1. The X and Y denominator accumulators 152 and 156 sum up the digital results from the A/D conversions. The X and Y numerator accumulators 150 and 154 compute the weighted sum of the input data rather than the straight sum. X and Y numerator and denominator accumulators 150, 152, 154, and 156 may be configured as hardware elements or as software running on a microprocessor as will be readily understood by those of ordinary skill in the art.

As may be seen from an examination of FIG. 8, X and Y numerator accumulators 150 and 154 compute the expression of Eq. 4:

$$\sum_{i=0}^{n} i \times C_i \quad \text{[Eq. 5]}$$

and X and Y denominator accumulators 152 and 156 compute the expression of Eq. 4:

$$\sum_{i=0}^{n} C_i \quad \text{[Eq. 6]}$$

The contents of X and Y numerator and denominator offset registers 158, 160, 162, and 164 are subtracted from the results stored in the X and Y numerator and denominator accumulators 150. 152, 154, and 156 in adders 166, 168, 170, and 172. Adder 166 subtracts the offset $O_{NX}$ stored in X numerator offset register 158. Adder 168 subtracts the offset $O_{DX}$ stored in X denominator offset register 160. Adder 170 subtracts the offset $O_{NY}$ stored in Y numerator offset register 162. Adder 172 subtracts the offset $O_{DY}$ stored in Y denominator offset register 164. The numerator denominator pairs are divided by division blocks 174 and 176 to produce the X and Y position data, and the X and Y denominator pair is used by block 178 to produce Z axis (pressure) data. The function performed by block 178 will be disclosed later herein. The offsets $O_{DX}$, $O_{NX}$, $O_{DY}$, and $O_{NY}$ are sampled from the X and Y numerator and denominator accumulators 150, 152, 154, and 156 contents when directed by calibration unit 180.

Persons of ordinary skill in the art will readily appreciate that the architecture of the system of the present invention may be distributed in a number of ways, several of which involve the availability of a microprocessor, whether it be in a host computer to which the system of the present invention is connected or somewhere between the integrated circuit described herein and a host computer. Embodiments of the present invention are contemplated wherein the accumulated numerator and denominator values representing the summation terms are delivered to such a microprocessor along with the $O_N$ and $O_D$ offset values for processing, or where all processing is accomplished by a programmed microprocessor as is known in the art.

Initially, the X and Y numerator and denominator accumulators 150, 152, 154, and 156 are set to zero during system startup. If the multiplexed A/D converters 52-1 through 52-6 as shown in FIG. 7 are employed, the digitized voltage data in the first word of register 138-1 (representing the voltage at the output of sample/hold circuit 50-1) is added to the sum in the accumulator and the result stored in the accumulator. In succession, the digitized voltage values stored in the first word of registers 138-2 through 138-6 (representing the voltage at the outputs of sample/hold circuits 50-5, 50-9, 50-17, and 50-21, respectively) are added to the sums in the accumulators and the results stored in the accumulators. As previously mentioned, ND converters 52-1 through 52-6 may at this time be converting the voltages present at the outputs of sample/hold circuits 50-2, 50-6, 50-10, 50-14, 50-18, and 50-22 and storing the digitized values in the second words of registers 138-1 through 138-6 respectively.

Next, in succession, the digitized voltage values stored in the second words of registers 138-1 through 138-6 (representing the voltage at the outputs of-sample/hold circuits 50-2, 50-6, 50-10, 50-14, 50-18, and 50-22, respectively) are added to the sum in the accumulator and the result stored in the accumulator.

Next, in succession, the digitized voltage values stored in the first words of registers 138-1 through 138-6 (representing the voltage at the outputs of sample/hold circuits 50-3, 50-7, 50-11, 50-15, 50-19, and 50-23, respectively) are added to the sum in the accumulator and the result stored in the accumulator, followed by digitized voltage values stored in the second words of registers 138-1 through 138-6 (representing the voltage at the outputs of sample/hold circuits 50-4, 50-8, 50-12, 50-16, 50-20, and 50-24, respectively).

At this point in time, the accumulators hold the sums of all of the individual digitized voltage values. The digital values stored in the $O_N$ and $O_D$ offset registers 158 and 164 are now respectively subtracted from the values stored in the numerator and denominator accumulators. The division operation in dividers 174 and 176 then completes the weighted average computation.

The division operation may also be performed by an external microprocessor which can fetch the values stored in the accumulators or perform the accumulations itself. As the $O_N$ and $O_D$ offset values are presently derived by an external microprocessor, the additional processing overhead presented to such external microprocessor by this division operation is minimal. Alternately, a dedicated microprocessor may be included on chip to handle these processing tasks without departing from the invention disclosed herein.

The above disclosed processing takes place within about 1 millisecond and may be repeatedly performed. Current mouse standards update position information 40 times per second, and thus the apparatus of the present invention may easily be operated at this repetition rate.

Because of the nature of the method employed in the present invention, an opportunity exists to provide additional noise immunity without requiring additional hardware in the system of the present invention. While it is apparent that after the above-disclosed sequence has been performed, the accumulators may be cleared and the process repeated, the values may also be allowed to remain in the accumulators. If this is done, an averaging function may be implemented to further filter out noise. According to this aspect of the invention, a number of samples are taken and run through the accumulators without clearing them at the end of the processing sequence. As presently preferred, twenty-five samples are processed before a single division result is taken for use by the system, thus greatly reducing the effects of transient system noise spikes. Those of ordinary skill in the art will recognize that the number of samples taken prior to clearing the accumulators is a matter of design choice dictated by factors such as data acquisition rates, data processing rates etc.

The system of the present invention is adaptable to changing conditions, such as component aging, changing capacitance due to humidity, and contamination of the touch surface, etc. In addition, the present invention effectively minimizes ambient noise. According to the present invention, these effects are taken into consideration in three ways. First, the offset values $O_N$ and $O_D$ are dynamically updated to accommodate changing conditions. Second, a servo-feedback circuit is provided to determine the bias voltage used to set the bias of the charge-integrator circuits 44-1 through 44-n. Third, as previously disclosed herein, the reference voltage points for $V_{max}$ and $V_{min}$ of the A/D converters 52 are also dynamically altered to increase the signal to noise margin.

Figure 9:
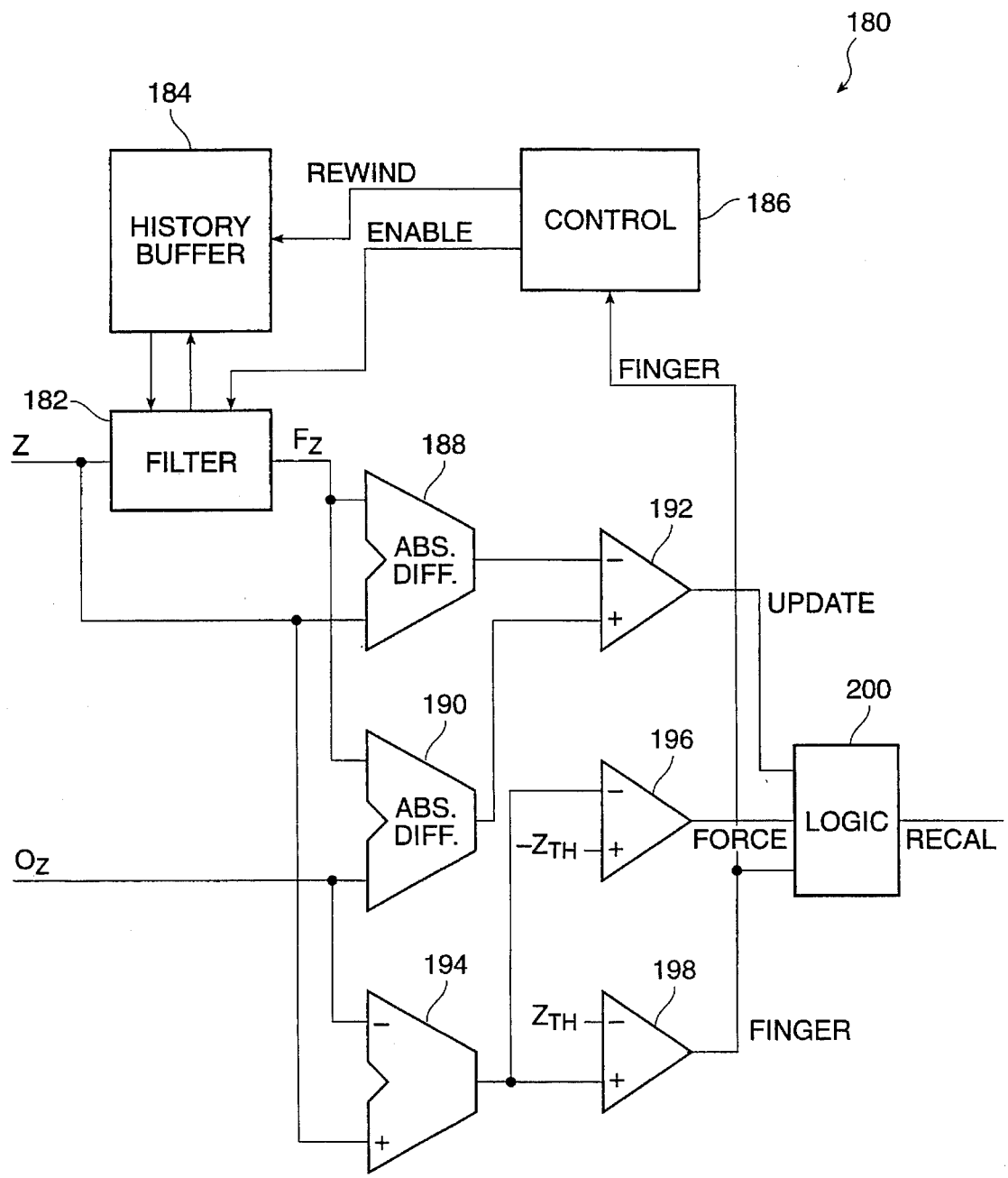
FIG. 9 is a block diagram of a calibration unit which may be used with the arithmetic unit of FIG. 8.

Referring now to FIG. 9, a block diagram of a calibration unit 180 which may be used with the arithmetic unit 16 of FIG. 8 is presented. The calibration unit 180 executes an algorithm to establish the numerator and denominator offset values by attempting to determine when no finger or other conductive object is proximate to the touch sensor array 22.

As previously disclosed, the $O_N$ and $O_D$ offset values represent the baseline values of the array capacitances with no object present. These values are also updated according to the present invention since baseline levels which are too low or too high have the effect of shifting the apparent position of the object depending on the sign of the error. These values are established by selection of the values read when no object is present at the touch sensor array 22. Since there is no external way to "know" when no object is present at touch sensor array 22, an algorithm according to another aspect of the present invention is used to establish and dynamically update these offset values. When the calibration unit 180 sees a Z value which appears typical of the Z values when no finger is present, it instructs the offset registers (158, 160, 162, and 164 of FIG. 8) to reload from the current values of the X and Y numerator and denominator accumulators 150, 152, 154, and 156. According to a presently preferred embodiment of the invention, the decision to update the offset values is based on the behavior of the touch sensor array 22 in only one of the X or Y directions, but when the decision is made all four offsets ($O_{NX}$, $O_{DX}$, $O_{NY}$, and $O_{DY}$) are updated. In other embodiments of the invention, the decision to update may be individually made for each direction according to the criteria set forth herein.

The calibration algorithm works by monitoring changes in a selected one of the denominator accumulator values. According to the present invention, it has been observed that the sensitivity to changes in capacitance of one of the sets of conductive lines in the touch sensor array 22 is greater than the sensitivity to changes in capacitance of the other one of the sets of conductive lines in the touch sensor array 22. Experience suggests that the set of conductive lines having the greater sensitivity to capacitance changes is the one which is physically located above the set of conductive lines in the other direction and therefore closest to the touch surface of the touch sensor array 22. The upper set of conductive lines tends to partially shield the lower set of conductive lines from capacitive changes occurring above the surface of the touch sensor array 22.

The finger pressure is obtained by summing the capacitances measured on the sense lines. This value is already present in the denominator accumulator after subtracting the offset $O_D$. A finger is present if the pressure exceeds a suitable threshold value. This threshold may be chosen experimentally and is a function of surface material and circuit timing. The threshold may be adjusted to suit the tastes of the individual user.

The pressure reported by the device is a simple function $f(X_D, Y_D)$ of the denominators for the X and Y directions as implemented in block 178 of FIG. 8. Possible functions include choosing one preferred denominator value, or summing the denominators. In a presently preferred embodiment, the smaller of the two denominators is chosen. This choice has the desirable effect of causing the pressure to go below the threshold if the finger moves slightly off the edge of the pad, where the X sensors are producing valid data, but the Y sensors are not, or vise versa. This acts as an electronic bezel which can take the place of a mechanical bezel at the periphery of the sensor area.

In the example of FIG. 8, the Y denominator is chosen for monitoring because it is the most sensitive. The chosen denominator is referred to as Z for the purposes of the calibration algorithm. The current saved offset value for this denominator is referred to as $O_Z$.

The goal of the calibration algorithm is to track gradual variations in the resting Z level while making sure not to calibrate to the finger, nor to calibrate to instantaneous spikes arising from noise. As will be apparent to those of ordinary skill in the art from the following disclosure, the calibration algorithm could be implemented in digital or analog hardware, or in software. In a current embodiment actually tested by the inventors, it is implemented in software.

As Z values arrive in the calibration unit 180, they are passed through filter 182. History buffer 184, which operates in conjunction with filter 182, keeps a "running average" of recent Z values. When a new Z value arrives, the current running average $F_Z$ is updated according to the formula:

$$\text{new } F_Z = \alpha(\text{old } F_Z) + (1-\alpha)Z \qquad \text{Eq. 7}$$

where $\alpha$ is a constant factor between 0 and 1 and typically close to 1 and Z is the current Z value. In the preferred embodiment, alpha is approximately 0.95. The intention is for $F_Z$ to change slowly enough to follow gradual variations, without being greatly affected by short perturbations in Z.

The filter 182 receives a signal ENABLE from control unit 186. The running average $F_Z$ is updated based on new Z values only when ENABLE is asserted. If ENABLE is deasserted, $F_Z$ remains constant and is unaffected by current Z.

The history buffer 184 records the several most recent values of $F_Z$. In the present embodiment, the history buffer 184 records the two previous $F_Z$ values. The history buffer 184 might be implemented as a shift register, circular queue, or analog delay line. When the history buffer 184 receives a REWIND signal from control unit 186, it restores the current running average $F_Z$ to the oldest saved value. It is as if the filter 182 were "retroactively" disabled for an amount of time corresponding to the depth of the history buffer 184. The purpose of the history buffer 184 is to permit such retroactive disabling.

The current running average $F_Z$ is compared against the current Z value and the current offset $O_Z$ by absolute difference units 188 and 190, and comparator 192. Absolute difference unit 188 subtracts the values Z and $F_Z$ and outputs the absolute value of their difference. Absolute difference unit 190 subtracts the values $O_Z$ and $F_Z$ and outputs the absolute value of their difference. Comparator 192 asserts the UPDATE signal if the output of absolute difference unit 188 is less than the output of absolute difference unit 190, i.e., if $F_Z$ is closer to Z than it is to $O_Z$. The UPDATE signal will tend to be asserted when the mean value of Z shifts to a new resting level. It will tend not to be asserted when Z makes a brief excursion away from its normal resting level. The filter constant α determines the length of an excursion which will be considered "brief" for this purpose.

Subtractor unit 194 is a simple subtractor that computes the signed difference between Z and $O_Z$. This subtractor is actually redundant with subtractor 172 in FIG. 8, and so may be merged with it in the actual implementation. The output $C_Z$ of this subtractor is the calibrated Z value, an estimate of the finger pressure. This pressure value is compared against a positive and negative Z threshold by comparators 196 and 198. These thresholds are shown as $Z_{TH}$ and $-Z_{TH}$, although they are not actually required to be equal in magnitude.

If pressure signal $C_Z$ is greater than $Z_{TH}$, the signal FINGER is asserted indicating the possible presence of a finger. The $Z_{TH}$ threshold used by the calibration unit 180 is similar to that used by the rest of the system to detect the presence of the finger, or it may have a different value. In the present embodiment, the calibration $Z_{TH}$ is set somewhat lower than the main $Z_{TH}$ to ensure that the calibration unit 180 makes a conservative choice about the presence of a finger.

If pressure signal $C_Z$ is less than $-Z_{TH}$, the signal FORCE is asserted. Since $O_Z$ is meant to be equal to the resting value of Z with no finger present, and a finger can only increase the sensor capacitance and thus the value of Z, a largely negative $C_Z$ implies that the device must have incorrectly calibrated itself to a finger, which has just been removed. Calibration logic 200 uses this fact to force a recalibration now that the finger is no longer present.

Control unit 186 is responsible for preventing running average $F_Z$ from being influenced by Z values that occur when a finger is present. Output ENABLE is generally off when the FINGER signal is true, and on when the FINGER signal is false. However, when FINGER transitions from false to true, the control unit 186 also pulses the REWIND signal. When FINGER transitions from true to false, the control unit 186 waits a short amount of time (comparable to the depth of the history buffer 184) before asserting ENABLE. Thus, the running average is prevented from following Z whenever a finger is present, as well as for a short time before and after the finger is present.

Calibration logic 200 produces signal RECAL from the outputs of the three comparators 192, 196, and 198. When RECAL is asserted, the offset registers $O_N$ and $O_D$ will be reloaded from the current accumulator values. RECAL is produced from the following logic equation:

RECAL=FORCE or (UPDATE and not FINGER).                Eq. 8

In addition, calibration logic 200 arranges to assert RECAL once when the system is first initialized, possibly after a brief period to wait for the charge integrators and other circuits to stabilize.

From the descriptions of control unit 186 and calibration logic 200, it will be apparent to those of ordinary skill in the art that these blocks can be readily configured using conventional logic as a matter of simple and routine logic design.

It should be obvious to any person of ordinary skill in the art that the calibration algorithm described is not specific to the particular system of charge integrators and accumulators of the current invention. Rather, it could be employed in any touch sensor which produces proximity or pressure data in which it is desired to maintain a calibration point reflecting the state of the sensor when no finger or spurious noise is present.

Figure 10:
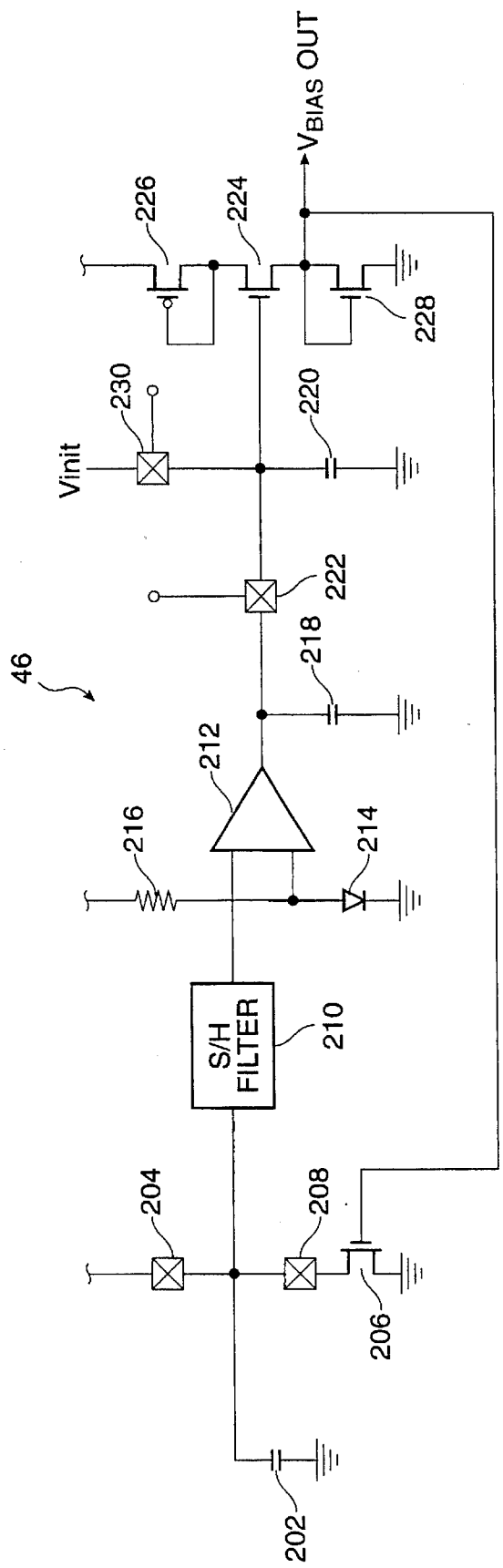
FIG. 10 is a schematic diagram of a bias voltage generating circuit useful in the present invention.

Referring now to FIG. 10, a bias voltage generating circuit 46 useful in the present invention is shown in schematic diagram form. According to a presently preferred embodiment of the invention, all of the N-Channel MOS bias transistors 108 (FIG. 4b) of charge integrator circuits 44-1 through 44-n have their gates connected to a single source of bias voltage, although persons of ordinary skill in the art recognize that other arrangements are possible. There are a number of ways in which to generate the bias voltage required by charge integrator circuits 44-1 through 44-n.

As may be seen from an examination of FIG. 10, the bias voltage generating circuit 46 is an overdamped servo system. A reference source which approximates the current source function of a typical one of the charge integrator circuits 44-1 through 44-n includes a capacitor 202 having one of its plates grounded. The other one of its plates is connected to the $V_{DD}$ power supply through a first pass gate 204 and to a current source transistor 206 through a second passgate 208. A filter circuit 210, identical to the filter circuits 48-1 through 48-n and controlled by the same signal as filter circuits 48-1 through 48-n is connected to sample the voltage on capacitor 202 in the same manner that the filter-and-sample/hold circuits 48-1 through 48-n sample the voltages on the sensor conductor capacitances in the touch sensor array 22.

The output of filter circuit 210 is fed to the non-inverting input of a weak transconductance amplifier 212, having a bias current in the range of from about 0.1–0.2 μA. The inverting input of the transconductance amplifier 212 is connected to a fixed voltage of about 1 volt generated, for example, by diode 214 and resistor 216. The output of transconductance amplifier 212 is shunted by capacitor 218 and also by capacitor 220 through passgate 222. Capacitor 220 is chosen to be much larger than capacitor 218. In a typical embodiment of the present invention, capacitor 218 may be about 0.2 pF and capacitor 220 may be about 10 pF.

Capacitor 220 is connected to the gate of N-Channel MOS transistor 224, which has its drain connected to the drain and gate of P-Channel MOS transistor 226 and its source connected to the drain and gate of N-Channel MOS transistor 228. The source of P-Channel MOS transistor 226 is connected to VDD and the source of N-Channel MOS transistor 228 is connected to ground. The common drain connection of transistors 224 and 228 is the bias voltage output node.

An optional passgate 230 may be connected between a fixed voltage source (e.g., about 2 volts) and capacitor 220. Passgate 230 may be used to initialize the bias generating circuit 46 on startup by charging capacitor 220 to the fixed voltage.

During each sample period, the filter circuit 210 takes a new sample. If the new sample differs from the previous sample, the output voltage of transconductance amplifier 212 will change and start to charge or discharge capacitor 218 to a new voltage. Passgate 222 is switched on for a short time (i.e., about 1 μsec) and the voltages on capacitors 218 and 220 try to average themselves. Due to the large size difference between capacitors 218 and 220, capacitor 218 cannot supply enough charge to equalize the voltage during the period when passgate 222 is open. This arrangement prevents large changes in bias voltage from cycle to cycle.

Capacitor 202 should look as much as possible like one of the sensor array lines and has a value equal to the background capacitance of a typical sensor line, (i.e., with no object proximate or present capacitance component). Capacitor 202 may be formed in several ways. Capacitor 202 may comprise an extra sensor line in a part of the sensor array, configured to approximate one of the active sensor lines but shielded from finger capacitance by a ground plane, etc. Alternately, capacitor 202 may be a capacitor formed in the integrated circuit or connected thereto and having a value selected to match that of a typical sensor line. In this respect, the signal source comprising capacitor 202 and filter circuit 210 is somewhat like the circuitry for generating the $V_{max}$ and $V_{min}$ reference voltages, in that it mimics a typical sensor line.

As another alternative, one of the actual sensor lines may be employed to set the bias voltage. The measured voltage on the two end-point sensor lines may be compared and the one having the lowest value may be selected on the theory that, if a finger or other object is proximate to the sensor array, it will not be present at sensor lines located at the opposite edges of the array.

According to another aspect of the present invention, an "edge motion" feature may be implemented when the object position sensor of the present invention is used as a computer cursor control device in place of a mouse. A practical problem arises in the use of computer mice or other cursor control devices when an attempt is made to move an object over a large distance on a computer screen. This problem is encountered when a small mouse pad is used with a computer mouse, or when an object position sensor of the kind described herein has a small touch sensor area.

In touch sensor applications, this problem is especially acute during a "drag" gesture. If the user lifts the finger to begin a second stroke, the drag effect ends prematurely on the screen. The edge motion feature of the present invention helps to eliminate the need to use "rowing," or multiple strokes of the finger to move a large distance on the screen.

A prior solution to the long-distance drag problem has been to provide an acceleration feature, i.e., a "ballistic" curve, where the gain varies as a function of finger speed, allowing the user to move long distances, albeit clumsily, using a repeated finger swishing motion. This technique can be used with any variable-speed pointing device, for example, with a mouse on a mouse pad of limited size. Typical mouse driver software includes an adjustable acceleration feature (sometimes under a misleading name like "mouse speed").

The system of the present invention can distinguish between the commonly used "click", "double click" and "drag" mouse gestures. The single-click and double-click gestures are implemented in a mouse using the mouse to move the cursor to the object of interest on the computer screen and then "clicking" once or twice a mouse button connected to an electrical switch in the mouse body. A significant advantage of the present invention is that the need for mechanical switches is eliminated, and the single-click and double-click gestures are implemented in the present invention by moving the cursor to the object of interest and then tapping a finger tip once or twice on the selected object. The present system can easily distinguish these gestures from the drag gesture in which the finger is placed on the touch sensor surface and dragged across the surface in a desired direction while maintaining contact with the surface.

Figure 11:
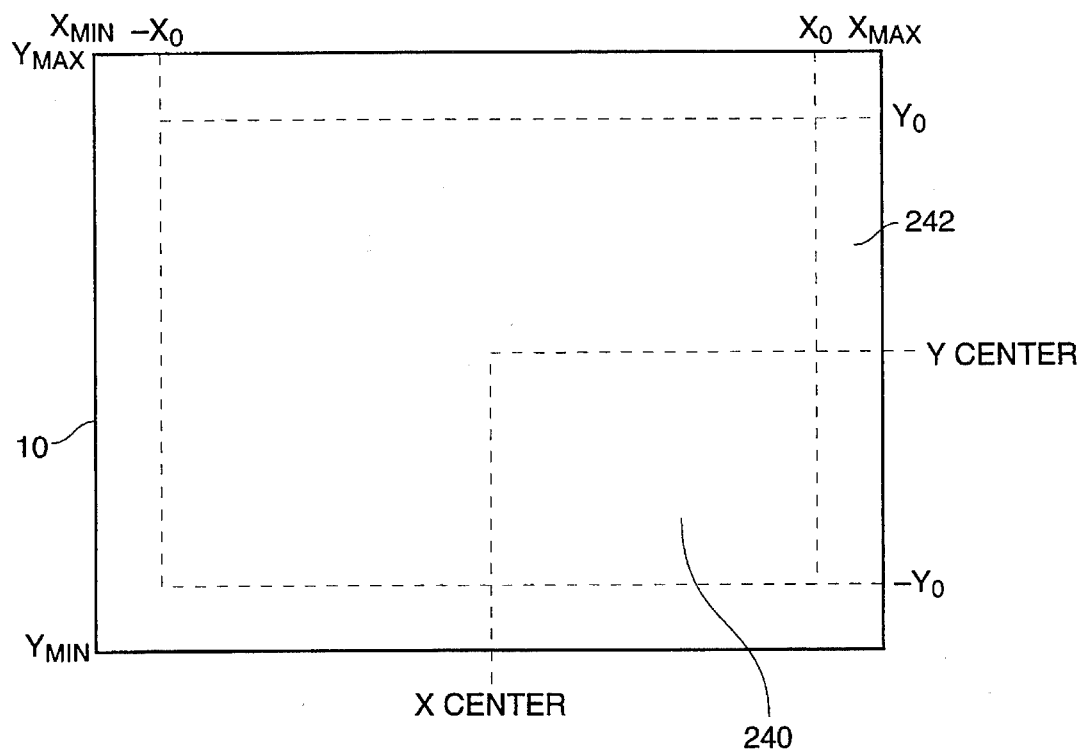
FIG. 11 is a diagram of the sensing plane illustrating the edge motion feature of the object position sensor of the present invention.

According to a presently preferred embodiment of the invention, the edge motion feature of the object position sensor is implemented by motion unit 18 of FIG. 1 and works by defining two zones in the sensing plane 10 containing the touch sensor array 22. As shown in FIG. 11, the sensing plane 10 is preferably divided into an inner zone 240 comprising most of the central portion of the surface of sensing plane 10 and an outer zone 242, typically comprising a thin marginal area at the periphery of the sensor array. The center of the sensing plane 10 may be described as the origin ($X_{center}$, $Y_{center}$) in a cartesian coordinate system. Those of ordinary skill in the art will recognize however that the inner and outer zones could be of any shape.

Thus in FIG. 11, inner zone 240 is defined by the upper dashed line $Y_0$, right-hand dashed line $X_0$, lower dashed line $-Y_0$ and left-hand dashed line $-X_0$. Outer zone 242 is the region between the outer edges of the sensing plane 10 defined by $Y_{max}$, $Y_{min}$, $X_{max}$ and $X_{min}$ and the outer borders of inner zone 240 defined by $Y_0$, $X_0$, $-Y_0$, and $-X_0$.

According to this aspect of the present invention, finger motions in the inner zone 240 are translated in the standard fashion into motion events to be sent to the host computer. As is well understood in the art, the standard way to communicate mouse motion to a host computer may also be employed in the present invention to communicate finger motion to a host computer. After the finger position is established as disclosed herein, the information communicated to the host computer is:

$$\Delta X = A(X_{cur} - X_{old}) \qquad \text{Eq. 9}$$

$$\Delta Y = A(Y_{cur} - Y_{old}) \qquad \text{Eq. 10}$$

where $\Delta X$ is the change in the X position of the finger, $\Delta Y$ is the change in the Y position of the finger, $X_{cur}$ is the current X position of the finger and $X_{old}$ is the last reported X position of the finger, $Y_{cur}$ is the current Y position of the finger and $Y_{old}$ is the last reported Y position of the finger, and A is a "gain factor" which is commonly encountered in mouse cursor control applications.

Typically, the host computer takes ($\Delta X$, $\Delta Y$) events and moves the cursor by the indicated amount in each axis, thus reconstructing the finger position on the screen as the successive $\Delta X$ and $\Delta Y$ values are accumulated. So far, this is standard cursor control behavior where edge motion is not considered.

According to the present invention, when the finger is reported as being in the outer zone 242, the edge motion feature of the present invention may be enabled. The determination of whether the finger is in the outer zone is a simple determination:

$$[-X_0 < X_{cur} < X_0] \text{ is FALSE, OR } [-Y_0 < Y_{cur} < Y_0] \text{ is FALSE} \qquad \text{Eq. 11}$$

Figure 12:
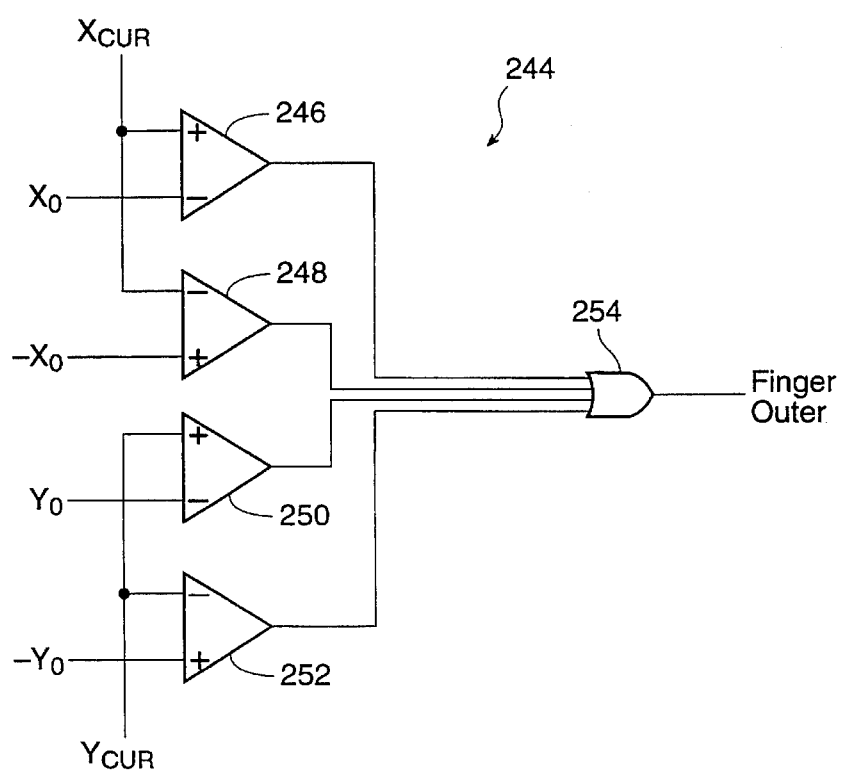
FIG. 12 is a schematic diagram illustrating hardware implementation of the determination of whether a finger or other object is present in the peripheral regions of the sensing plane.

Referring now to FIG. 12, a circuit 244 for making a determination of whether a finger is in the outer zone 242 is shown in schematic diagram form. FIG. 12 illustrates a hardware embodiment for determining whether a finger is in the outer zone 242, but those of ordinary skill in the art will readily recognize that this determination could readily be made by performing one of a number of equivalent software routines. Such software routines are obvious and straightforward from the functions described herein.

Circuit 244 includes digital comparators 246, 248, 250, and 252, which may be straightforwardly implemented by conventional logic. Comparator 246 puts out a true signal when the quantity $X_{cur}$ at one of its inputs is greater than the fixed quantity $X_0$ presented to its other input. Comparator 248 puts out a true signal when the quantity $X_{cur}$ at one of its inputs is less than the fixed quantity $-X_0$ presented to its other input. Comparator 250 puts out a true signal when the quantity $Y_{cur}$ at one of its inputs is greater than the fixed quantity $Y_0$ presented to its other input. Comparator 252 puts out a true signal when the quantity $Y_{cur}$ at one of its inputs is less than the fixed quantity $-Y_0$ presented to its other input.

The outputs of comparators 246, 248, 250, and 252 are ORed together by OR gate 254. As will be appreciated by those of ordinary skill in the art, the FingerOuter signal output of OR gate 254 is true only when the necessary conditions of Eq. 11 are satisfied.

It is presently preferred that the edge motion aspect of the present invention may be selectively enabled or disabled by a user. When the edge motion feature is enabled and the finger is reported as being in the outer zone as set forth above, a second component is added to the $(\Delta X, \Delta Y)$ events reported:

$$\Delta X = A(X_{cur} - X_{old}) + S(X_{cur} - X_{center}) \quad \text{Eq. 12}$$

$$\Delta Y = A(Y_{cur} - Y_{old}) + S(Y_{cur} - Y_{center}) \quad \text{Eq. 13}$$

where $X_{center}$ is the X coordinate of the center of the pad, $Y_{center}$ is the Y coordinate of the center of the pad, and S is a multiplicative factor for speed. S should be chosen such that the movement of the cursor is at a comfortable speed on the display screen.

For example, if the finger is held a good distance to the right (so that $X_{cur} > X_0$), then the cursor will tend to "glide" to the right at a constant speed set by multiplicative speed factor S in Eqs. 12 and 13. This factor can be adjusted to individual taste of a user.

If the touch sensor array 22 has different dimensions in X and Y, it is useful to set the multiplicative speed factor S parameters in the X and Y directions to differ by the same ratio as the pad dimensions, so that a finger held at the left or right edge of the touch sensor array 22 will produce the same cursor speed as a finger held at the top or bottom edge. In the presently preferred embodiment of the touch sensor array 22, there are 24 X traces and 18 Y traces. Therefore, since X is 4/3 wider than Y (24 traces vs. 18 traces), the X multiplicative speed factor $S_X$ is set to be to be 3/4 as large as the multiplicative speed factor $S_Y$.

The glide speed of the cursor during edge motion is clearly a direct function of the distance of the finger from the center of the pad, and the glide direction is equal to the direction of the finger from the center. If the outer zone has the preferred "edge margin" shape as shown in FIG. 11, then the finger will always be roughly the same distance from the center whenever edge motion is activated (within a factor of the square root of 2= 1.41, assuming a square pad). Thus, the psychological effect is that edge motion involves a constant glide speed where the direction is set by the position around the touch sensor array 22 edge.

The square root of 2 variation may be canceled out by dividing the edge motion terms in equations (12 and 13) by a normalizing factor of the form:

$$\sqrt{(X_{cur} - X_{center})^2 + (Y_{cur} - Y_{center})^2} \quad \text{[Eq. 14]}$$

but this is a computationally intensive step applied to fix a problem that is barely noticeable to the average user; thus, it may be omitted.

The edge motion feature of the present invention can be confusing if the user does not expect it. Since edge motion is most useful in connection with the drag gesture, it is presently preferred to arrange for it to occur only during a drag, i.e., only when the gesture logic is virtually "holding the mouse button down." The drag gesture and other gestures are implemented by gesture unit 20 of FIG. 1.

At times when the edge-motion function is not desired, the outer zone 242 "goes away" (i.e., is ignored) and the inner zone 240 effectively expands to cover the entire sensing plane 10. It has been found that this is much less confusing in practice, probably because the user is more likely to be consciously aware of the cursor control device during a drag gesture than during simple cursor motions.

Assuming the preferred zone boundary shape of FIG. 11, the following algorithm may be employed to implement the edge motion feature of the present invention:

```
IF NOT (–X₀ < X_cur < X₀ AND –Y₀ < Y_cur < Y₀)
    AND (optionally) a drag gesture in progress, THEN
    Let eX = S_X(X_cur – X_center)
    Let eY = S_Y(Y_cur – Y_center)
ELSE
    Let eX = eY = O.
END IF
```

Next, the dX and dY motion terms are computed from the regular algorithm:
i.e.,
Let $dX = A(X_{cur} - X_{old})$
Let $dY = A(Y_{cur} - Y_{old})$ Finally, the resultant packet ($\Delta X = dX + eX$, $\Delta Y = dY + eY$) is transmitted to the host computer. Those of ordinary skill in the art will recognize that a linear proportionality is described by the above equation. As used herein, "proportionality" means that the signal generated is a monotonic function. Those of ordinary skill in the art will recognize that other monotonic functions, including but not limited to inverse proportionality, and non-linear proportionality such as logarithmic or exponential functions, could be employed in the present invention without departing from the principles disclosed herein.

Figure 13:
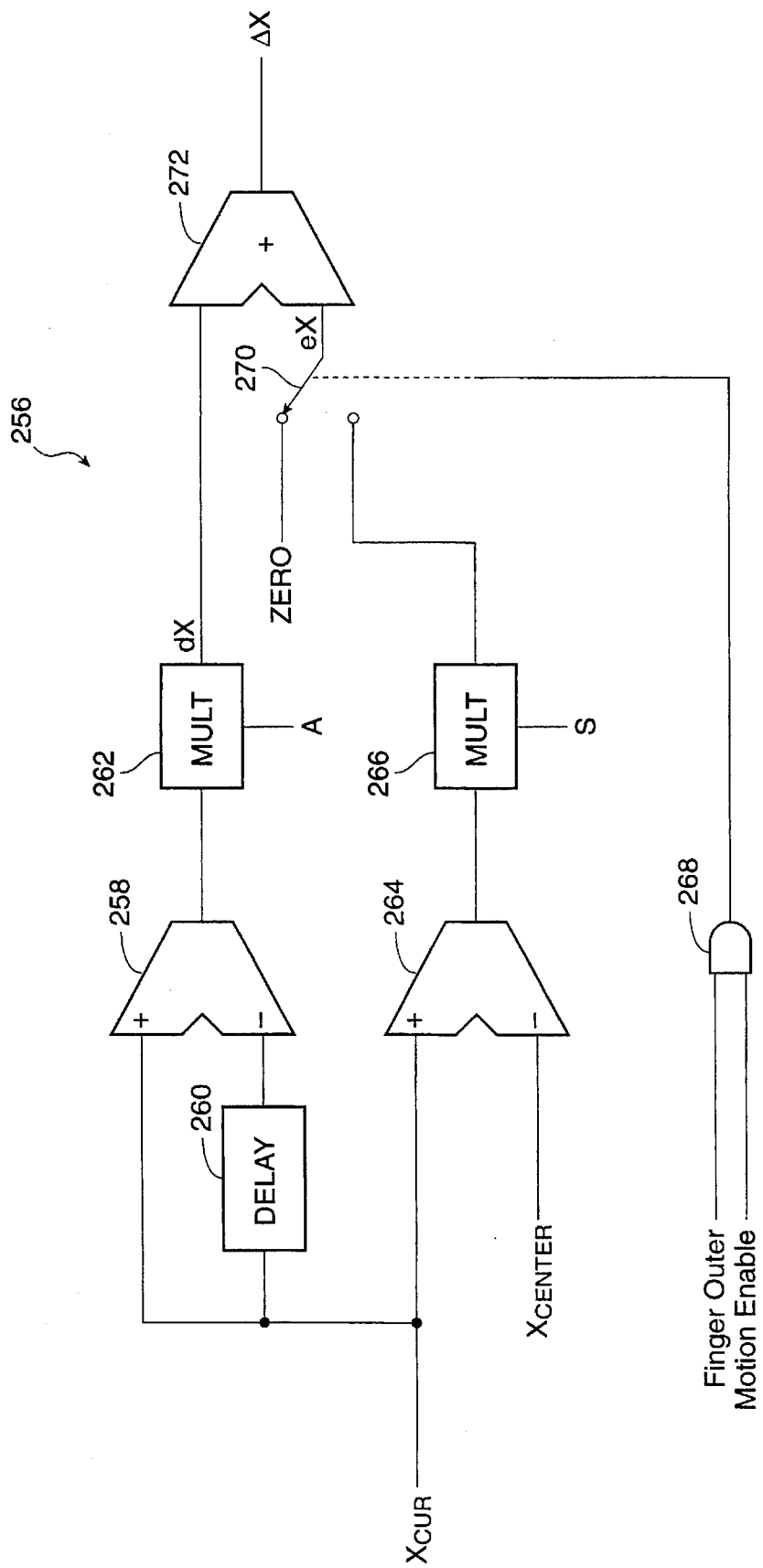
FIG. 13 is a schematic diagram illustrating hardware implementation of the edge motion feature of the present invention.

A hardware implementation of this algorithm is illustrated in FIG. 13 in schematic diagram form. While edge-motion circuit 256 is shown implemented in the X direction only, those of ordinary skill in the art will recognize that an identical circuit will also be employed in the Y direction. Such skilled persons will also immediately appreciate the complete equivalence of implementing the hardware solution of FIG. 13 as a software routine.

Edge-motion circuit 256 includes a subtractor circuit 258 in which the previous value of $X_{cur}$, stored in delay 260, is subtracted from the present value of $X_{cur}$. The output of subtractor circuit 258 is presented to multiplier 262, which multiplies the result by the gain factor "A". The output of multiplier 262 is the term dX.

The term $X_{cur}$ is also presented to subtractor circuit 264 in which the value of $X_{center}$ is subtracted from the present value of $X_{cur}$. The output of subtractor circuit 264 is presented to multiplier 266, which multiplies the result by the gain factor "S".

A two-input AND gate 268 has its input terms the value FingerOuter from the circuit of FIG. 12 and the value MotionEnable which is a toggled on/off enable signal for the edge motion feature of the present invention. If both FingerOuter and MotionEnable are true, switch 270 is configured to pass the output of multiplier 266 to adder circuit 272. If either FingerOuter or MotionEnable is false, then switch 270 is configured to pass the value zero to adder 272. The output of switch 270 is the eX term. The output of adder 272 is passed to the host computer as ΔX. The MotionEnable signal can be controlled by the user, e.g., by a control panel. Alternatively, it may be controlled by the gesture unit as will be more fully disclosed.

In an alternate form, the dX term may be replaced by the eX term, and likewise for dY and eY, when the finger is in the "outer" zone, rather than adding the two terms in that zone. This results in a more "pure" edge motion which is harder for the user to guide. User tests have shown that the dX+eX form shown above feels better and is easier to use.

Another alternative which is functional but has been found to be less desirable employs a somewhat wider outer zone. The glide speed is then varied in proportion to the distance of the finger into the outer zone rather than the distance from the center of the pad. Thus, as the finger enters the outer zone the glide speed starts at zero and increases to some reasonable limit as the finger reaches the edge of the pad. The result is a smoother transition between edge-motion and normal behavior. It is not difficult to modify the above formulas to produce this alternate behavior. This variant was tried by the inventors because the transition into edge-motion mode seemed too abrupt; tests showed that this abruptness is actually a boon in typical use. The smooth transition is harder to "feel", and thus winds up being more, not less, likely to catch the user by surprise. Those of ordinary skill in the art will appreciate that a solution midway between the two described methods can also be employed to produce a less abrupt transition.

An alternate solution to the long-distance drag problem has been to provide a "locking" drag, but this can be confusing since the lock state becomes a hidden mode, a well-known undesirable item in the study of user interfaces.

The edge motion feature of the present invention is used advantageously with one or more finger gestures which may be performed by a user on the touch sensor array 22 and are recognized by the system. Of particular interest are the basic tap and drag gestures. The tap gesture is analogous to the clicking of the mouse button on a conventional mouse, and the concept of dragging objects is familiar to all mouse users. The drag gesture consists of tapping once, followed by bringing the finger back down to the touch surface and moving it in the desired fashion. The host computer sees the virtual mouse button being held down during this entire gesture.

Referring back to FIG. 1, gesture unit 20 detects the tap and drag gestures as follows. There are four state variables used to recognize the tap and drag gestures: TapState, NONE if there is no gesture in progress, TAP if a tap gesture is in progress, or DRAG if a drag gesture is in process; TapOkay, TRUE if high enough Z (finger pressure) has been seen to qualify as a tap; DownTime, the time when the finger last touched down on the sensor pad; and DownPos, the starting (X,Y) position of the current tap.

The parameters utilized are: TapTime is the maximum duration of a tap gesture; DragTime is the maximum duration of a tap-and-drag gesture; TapRadius is the maximum distance moved during a tap gesture; Ztap is the minimum pressure (Z) for a tap gesture; and Zthresh is the minimum pressure (Z) to detect a finger.

Figure 14A:
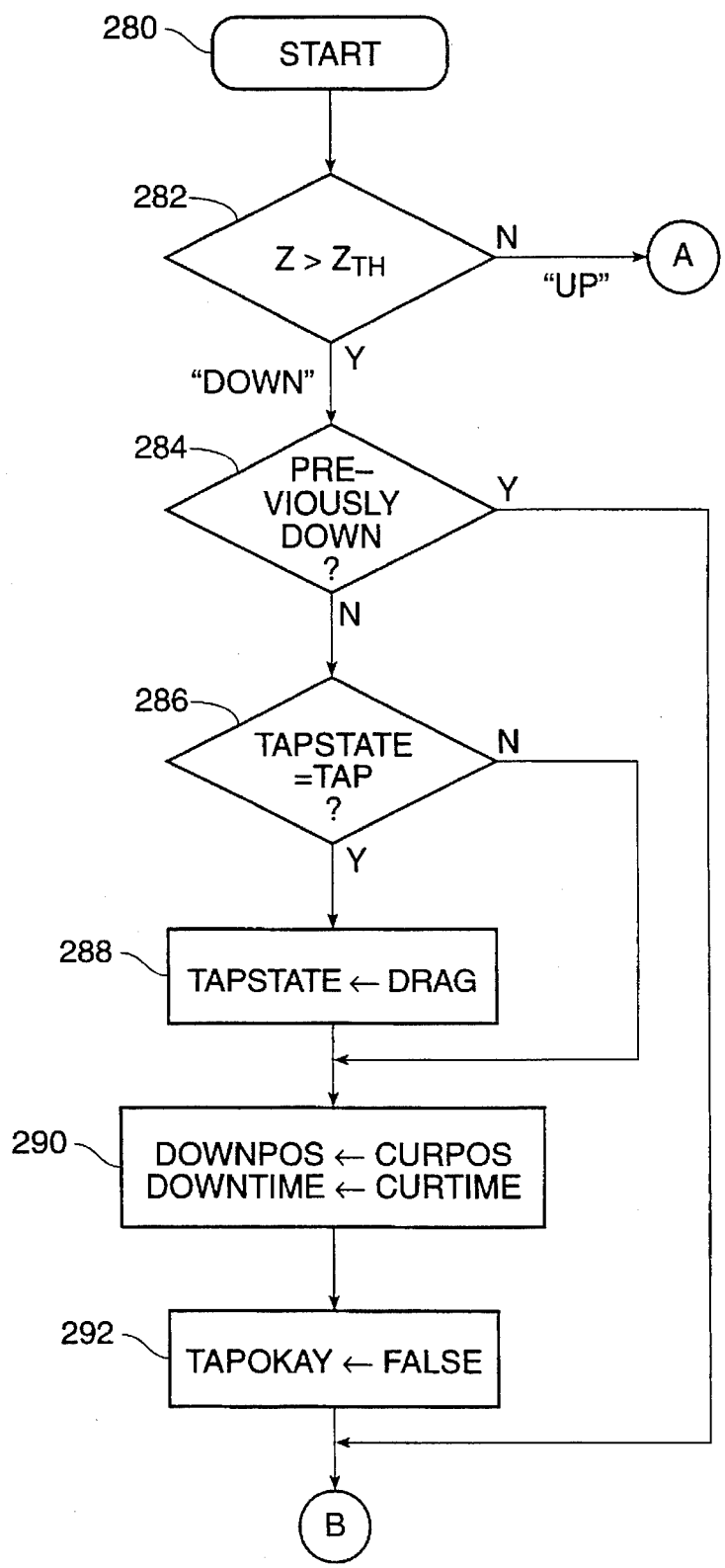
FIGS. 14a–14c are flow diagrams illustrating a process according to the present invention for recognizing tap and drag gestures.
Figure 14B:
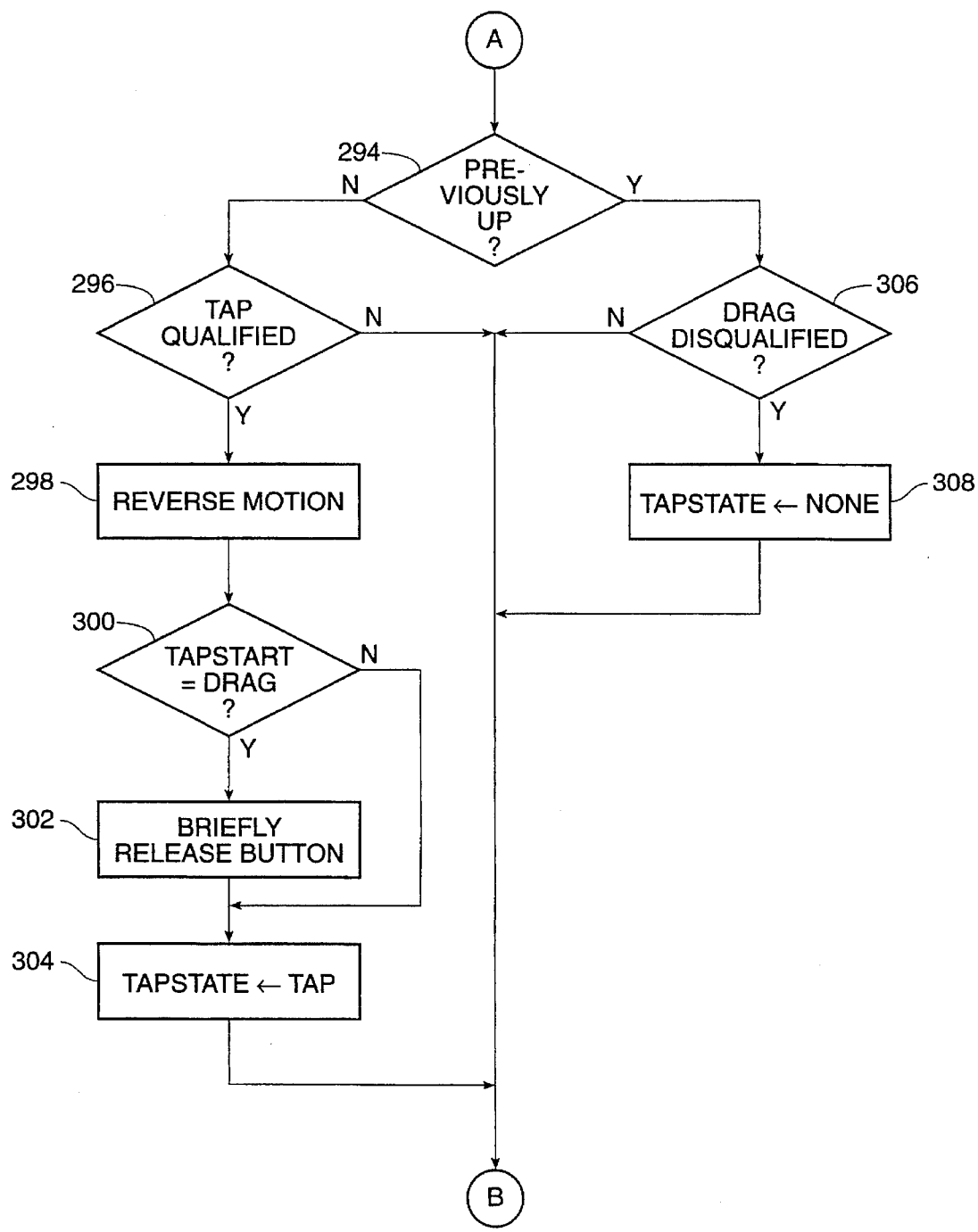
Figure 14C:
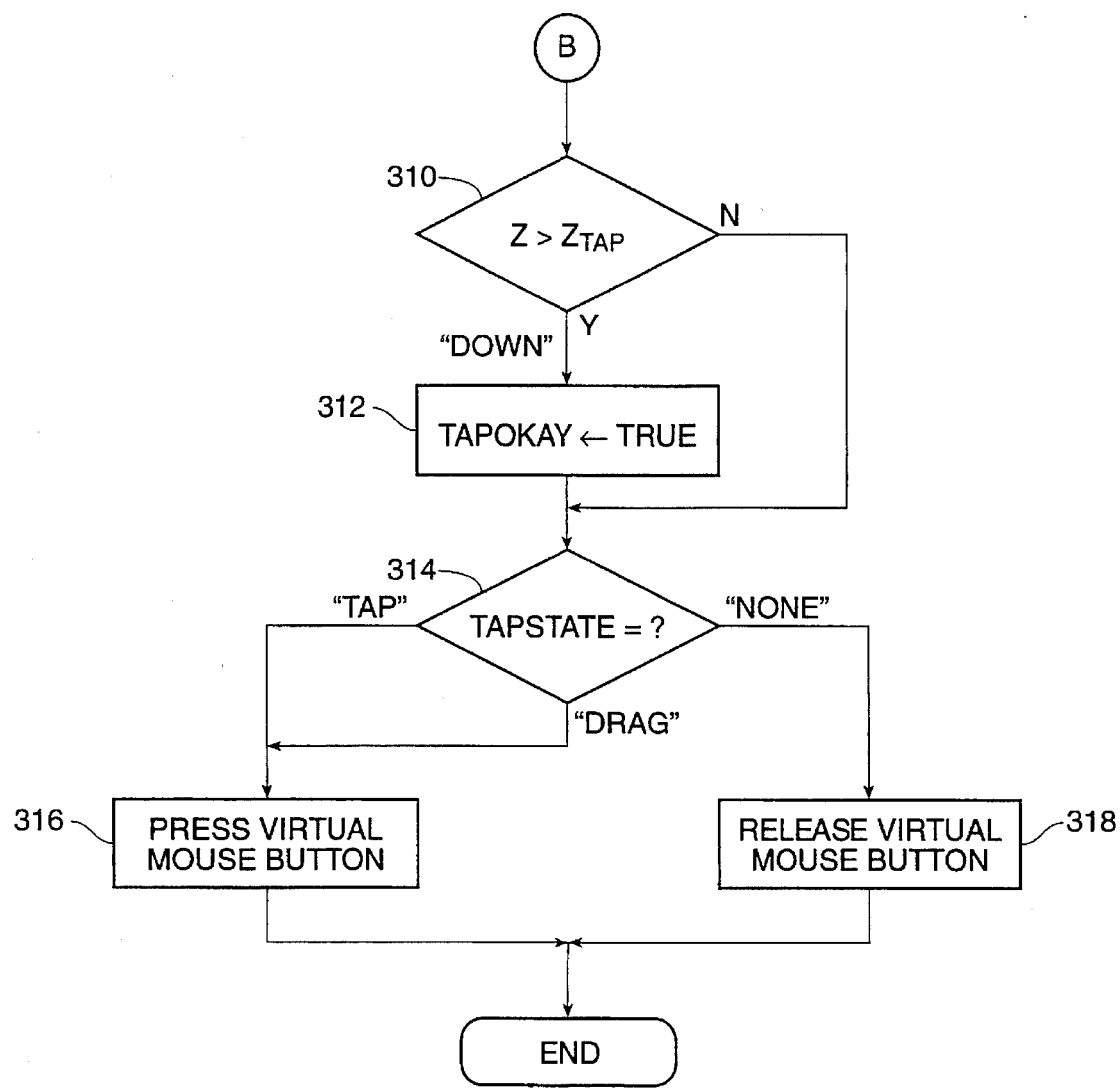

A process according to the present invention for recognizing tap and drag gestures is illustrated in the flow diagrams of FIGS. 14a–14c.

Processing begins at step 280 for every new set of (X,Y,Z) data to arrive from the arithmetic unit 16 of FIG. 1. In a current embodiment of the system, such data arrive 40 times per second.

In step 282, the Z (pressure) value is compared against the Z threshold Zthresh to determine whether a finger is present ("down") or not ("up"). Instead of a simple threshold comparison, two thresholds may be used to provide hysteresis as is well-known in the art.

In step 284, the finger is known to be down. The previous Z is checked to see whether the finger was previously down or is just now touching down on the pad.

In step 286, a finger-down transition has been detected. If a tap gesture has recently been reported (Tapstate= TAP), then, in step 288 this pending tap gesture is converted into a potential drag gesture.

Step 290 records the position and the time at which the finger touched down.

Step 292 initializes the TapOkay flag, which records whether or not the Z (pressure) information ever exceeds the Ztap threshold during the current tap.

In step 294, the finger is known to be up. The previous Z is checked to see whether the finger was previously up or is just now being lifted from the pad.

In step 296, a finger-up transition has been detected. Various tests are made of the most recent finger-down period to see if it qualifies as a tap. To qualify, the finger-down period must have short duration (CurTime minus DownTime must be less than TapTime), little or no motion (the distance from CurPos to DownPos must be less than TapRadius), and sufficient peak finger pressure (TapOkay must be TRUE), in order to qualify.

During the finger-down period which has qualified as a tap, a small amount of motion may have occurred due to natural vibration of the finger and other variations. This motion will have already been transmitted to the host, causing the cursor to drift slightly away from the intended target of the tap gesture. In step 298, this spurious motion is replayed to the host in reverse in order to cancel it out. The motion may be sent in a single lump-sum packet or replayed packet by packet. If the host computer is not expected to apply extreme non-linear gain ("ballistics") to the received packets, a simple lump-sum transmission will suffice.

Steps 300 and 302 give special consideration to multiple taps. If a tap gesture is recognized, and a previous tap gesture (at this point a potential drag gesture) is pending, then one or more packets reporting a release of the virtual mouse button are sent to the host. This prevents the virtual button presses resulting from the two taps from running together into a single long virtual button press. The special button-release packet may be accomplished by sending an extra packet to the host, or by setting a flag to suppress the virtual mouse button for the next subsequent packet.

Step 304 records that a tap gesture is now in progress.

In step 306, the finger is still away from the pad. If the finger has been away from the pad long enough so that the current tap gesture (if any) no longer qualifies to be extended into a drag (i.e., (Curtime minus DownTime exceeds Drag-Time), or if a drag gesture is pending (TapState is DRAG), then the current tap or drag is terminated in step 308 (causing the virtual mouse button to be released).

Steps 310 and 312 compare Z against Ztap. If Z is ever greater than Ztap during a given finger-down period, the TapOkay flag is set.

Steps 314, 316, and 318 cause the virtual mouse button to be pressed during a tap or drag gesture, and released at all other times.

In a current embodiment of an actual system according to the present invention, TapTime is a fraction of a second and may be adjusted by the user, DragTime is approximately equal to TapTime, and TapRadius is approximately 5–10% of the pad width.

The "MotionEnable" signal into AND gate 268 of FIG. 13 is obtained by either MotionEnable= (TapState= DRAG) or MotionEnable= (TapState= DRAG) OR (TapState= TAP).

While the foregoing disclosure refers to two particular gestures, those of ordinary skill in the art will recognize that other gestures may be employed in the system of the present invention.

Figure 15A:
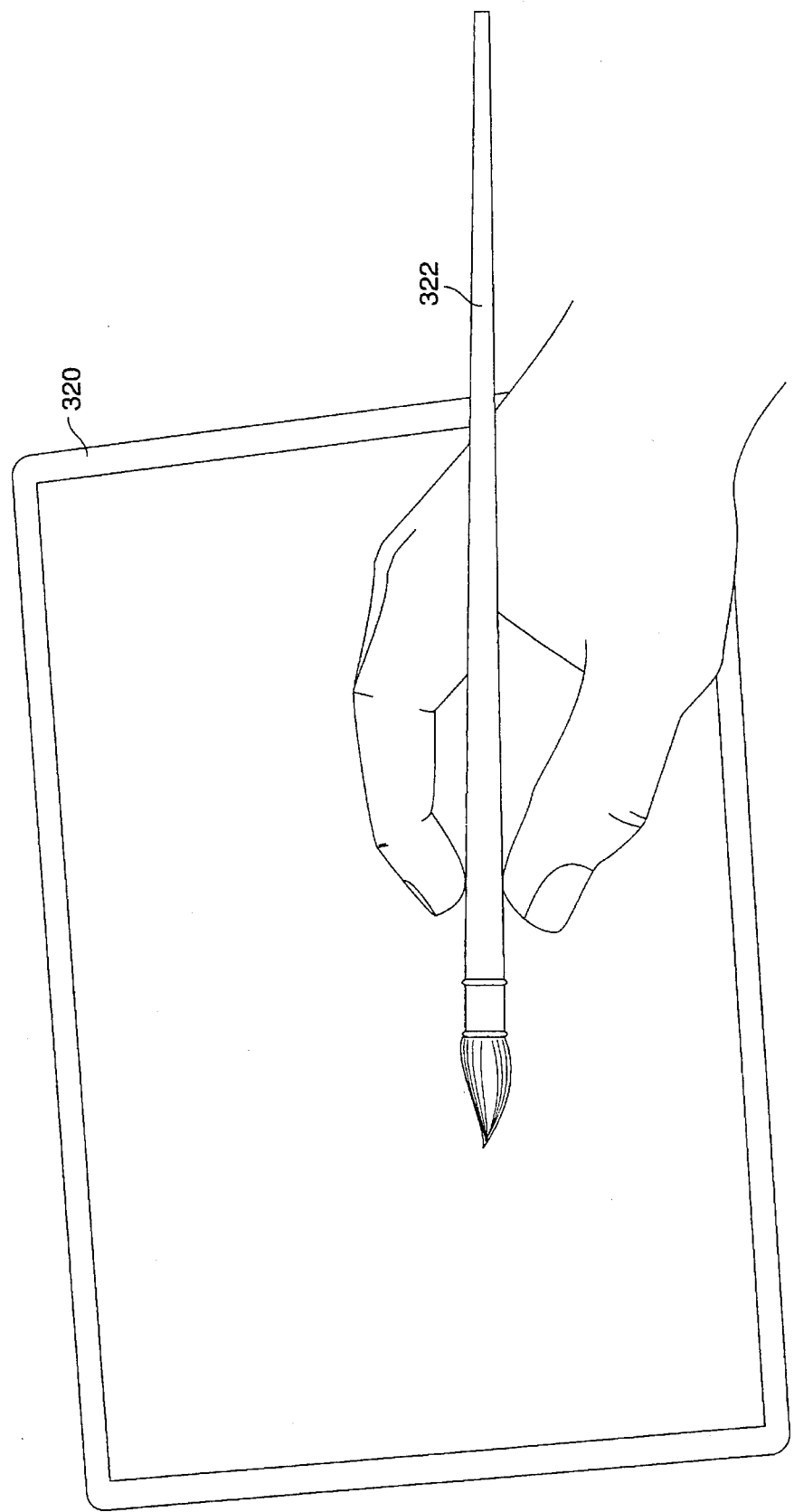
FIG. 15a shows a paintbrush stylus in use on a touch-sensor pad according to the present invention.

According to yet another aspect of the present invention, a conductive paintbrush-like stylus may be used in conjunction with the touch sensor pad according to the present invention. Referring now to FIG. 15a, a touch-sensor pad 320 like that disclosed in FIGS. 2a–2d may be employed although those of ordinary skill in the art will appreciate that it will preferably be sized large enough to facilitate "painting" by a user thereon with strokes from a conductive paintbrush stylus 322. Conductive paintbrush stylus 322 may be directly substituted for a finger and operates in the same manner previously disclosed herein as does a human finger or other conductive object.

Referring now to FIG. 15b, a paintbrush stylus 322 is shown in more detail. As in a conventional artist's paintbrush, paintbrush stylus 322 comprises a handle portion 324, from which extend a plurality of bristles 326. Those of ordinary skill in the art will recognize that, although paintbrush stylus 322 is shown as a stylized artist's brush, other handle and bristle styles are intended to fall within the scope of the present invention. Paintbrush stylus 322 is conductive and should be so formed as to have a resistance less than that of the typical skin resistance of a dry human finger, i.e., less than about 10M ohms.

Paintbrush stylus 322 operates on touch sensor pad 320 in the same manner as does a human finger, that is, it is capacitively coupled to the sensor array in the touch sensor pad 320. As will therefore be appreciated by those of ordinary skill in the art, numerous materials may be used to form paintbrush stylus 322. For example, the bristles 326 may be made from a plurality of strands of flexible fine wire, such as phosphor bronze wire strands each preferably having a thickness less than about 0.002 inch. Carbon fibers may also be used to form the bristles 326 of paintbrush stylus 322.

Handle portion 324 may also be formed from any one of a large variety of conductive materials. Non-limiting examples include various metals or carbon compositions, or substrate materials coated with a conductive layer such as a plated metal layer. Because the touch-sensor pad 320 of the present invention works by capacitive sensing, the handle portion 324 may be coated with a thin insulating material. For example, the paintbrush stylus 322 can be constructed from a bundle of carbon fibers, the upper portion of which is impregnated with plastic binder, and the lower portion of which is left free to form the bristles. If a separate conductive handle is used, it is preferably attached to the bristles using a conductive adhesive, for example, silver filled epoxy or the like. Since the area of contact of paintbrush stylus 322 with a human hand will be significantly larger than the area of contact of a typical human finger and the touch sensor pad 320, the added series capacitance provided by such a thin insulating layer on the handle portion 324 of paintbrush stylus 322 will not appreciably alter the operation of the touch-sensing system of the present invention.

As will be appreciated by those of ordinary skill in the art, the RC time constant formed by the product of the capacitance between the touch-sensor pad 320 and paintbrush stylus 322, and the resistance of paintbrush stylus 322, must be less than the sample period of the touch sensor system used with the touch sensor pad 320 or the sampled readings will be in error due to the lack of time to charge the capacitance during the sample interval. In a presently preferred embodiment, a sample period of 2 µsec is used. Since the capacitance between the touch sensor pad 320 and the paintbrush stylus 322 is 5 to 10 pF, the resistance of paintbrush stylus 322 should be less than about 100K ohms. Touch sensor systems like that disclosed herein may have sample periods as long as about 100 µsec, thus placing a practical resistance limit of about 10M ohms on paintbrush stylus 322.

The increased sensitivity of the touch sensor system of the present invention allows for a lighter input finger touch which makes it easy for human use. Increased sensitivity also makes it easier to use other input objects, like pen styli, etc. Additionally this sensitivity allows for a trade-off against a thicker protective layer, or different materials, which both allow for lower manufacturing costs.

Greater noise rejection allows for greater flexibility in use and reduced sensitivity to spurious noise problems. Two techniques are employed which allow derivation of the most noise-rejection benefit.

Due to the drive and sense techniques employed in the present invention, the data acquisition rate has been increased by about a factor of 30 over the prior art. This offers several obvious side effects. First, for the same level of signal processing, the circuitry can be turned off most of the time and reduce power consumption by roughly a factor of 30 in the analog section of the design. Second, since more data is available, more signal processing, such as filtering and gesture recognition, can be performed.

The sensor electronic circuit employed in the present invention is very robust and calibrates out process and systematic errors. It will process the capacitive information from the sensor and provide digital information to an external device, for example, a microprocessor.

Because of the unique physical features of the present invention, there are several ergonomically interesting applications that were not previously possible. Presently a mouse or trackball is not physically convenient to use on portable computers. The present invention provides a very convenient and easy-to-use cursor position solution that replaces those devices.

In mouse-type applications, the sensor of the present invention may be placed in a convenient location, e.g., below the "space bar" key in a portable computer. When placed in this location, the thumb of the user may be used as the position pointer on the sensor to control the cursor position on the computer screen. The cursor may then be moved without the need for the user's fingers to leave the keyboard. Ergonomically, this is similar to the concept of the Macintosh Power Book with its trackball, however the present invention provides a significant advantage in size over the trackball. Extensions of this basic idea are possible in that two sensors could be placed below the "space bar" key for even more feature control.

The computer display with its cursor feedback is one small example of a very general area of application where a display could be a field of lights or LEDs, an LCD display, or a CRT. Examples include touch controls on laboratory equipment where present equipment uses a knob/button/touch screen combination. Because of the articulating ability of this interface, one or more of those inputs could be combined into one of the inputs described with respect to the present invention.

Consumer Electronic Equipment (stereos, graphic equalizers, mixers) applications often utilize significant front panel surface area for slide potentiometers because variable control is needed. The present invention can provide such control in one small touch pad location. As Electronic Home Systems become more common, denser and more powerful human interface is needed. The sensor technology of the present invention permits a very dense control panel. Hand-held TV/VCR/Stereo controls could be ergonomically formed and allow for more powerful features if this sensor technology is used.

The sensor of the present invention can be conformed to any surface and can be made to detect multiple touching points, making possible a more powerful joystick. The unique pressure detection ability of the sensor technology of the present invention is also key to this application. Computer games, "remote" controls (hobby electronics, planes), and machine tool controls are a few examples of applications which would benefit from the sensor technology of the present invention.

Musical keyboards (synthesizers, electric pianos) require velocity sensitive keys which can be provided by the pressure sensing ability of this sensor. There are also pitch bending controls, and other slide switches that could be replaced with this technology. An even more unique application comprises a musical instrument that creates notes as a function of the position and pressure of the hands and fingers in a very articulate 3-d interface.

The sensor technology of the present invention can best detect any conducting material pressing against it. By adding a compressible insulating layer covered by a layer of conductive material on top of the sensor the sensor of the present invention may also indirectly detect pressure from any object being handled, regardless of its electrical conductivity.

Because of the amount of information available from this sensor it will serve very well as an input device to virtual reality machines. It is easy to envision a construction that allows position-monitoring in three dimensions and some degree of response (pressure) to actions.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A conductive paintbrush stylus for use with a capacitive touch sensor pad comprising:
   an electrically conductive handle;
   a plurality of electrically conductive bristles affixed to said handle;
   wherein the total resistance of said handle and said bristles is no more than the skin resistance of a human finger.

2. The conductive paintbrush stylus of claim 1 wherein said total resistance is less than about 10M ohms.

3. The conductive paintbrush stylus of claim 1 wherein said plurality of electrically conductive bristles are formed from carbon fibers.

4. The conductive paintbrush stylus of claim 1 wherein said plurality of electrically conductive bristles are formed from fine wire.

5. The conductive paintbrush stylus of claim 4 wherein said plurality of electrically conductive bristles are formed from phosphor bronze wire.

6. A conductive paintbrush stylus for use with a touch sensor pad having a characteristic capacitance, said paintbrush comprising:
   an electrically conductive handle;
   a plurality of electrically conductive bristles affixed to said handle;
   wherein the time constant of an RC circuit comprising the total resistance of said handle and said bristles and said characteristic capacitance is less than a sampling period used to sense the presence of a conductive object on said touch sensor pad.

7. The conductive paintbrush stylus of claim 6 wherein said plurality of electrically conductive bristles are formed from carbon fibers.

8. The conductive paintbrush stylus of claim 6 wherein said plurality of electrically conductive bristles are formed from fine wire.

9. The conductive paintbrush stylus of claim 8 wherein said plurality of electrically conductive bristles are formed from phosphor bronze wire.

10. The conductive paintbrush stylus of claim 6 wherein said plurality of electrically conductive bristles are affixed to said handle with a conductive adhesive.

11. A conductive paintbrush stylus for use with a touch sensor pad having a characteristic capacitance, said paintbrush comprising:
   a bundle of carbon fibers having a length extending substantially the length of said paintbrush stylus, a first portion of said length of said bundle impregnated with a thin insulating material to form a rigid handle, and a second portion of said length of said bundle remaining exposed to form conductive bristles;
   wherein the time constant of an RC circuit comprising the total resistance of said handle and said bristles and said characteristic capacitance is less than a sampling period used to sense the presence of a conductive object on said touch sensor pad.

* * * * *

UNITED STATES PATENT AND TRADEMARK OFFICE
CERTIFICATE OF CORRECTION

PATENT NO. : 5,488,204
DATED : 30 January 1996
INVENTOR(S) : Mead, et al.

It is certified that error appears in the above-indentified patent and that said Letters Patent is hereby corrected as shown below:

Column 13, line 9, replace "AV" with --$\Delta V$--.

Column 15, line 37, replace "M©S" with --MOS--.

Column 20, line 28, replace "ND" with --A/D--.

Column 24, line 59, replace "VDD" with --$V_{DD}$--.

Column 33, line 6, replace "TVNCR/Stereo" with --TV/VCR/Stereo--.

Signed and Sealed this

Twentieth Day of August, 1996

*Attest:*

BRUCE LEHMAN

*Attesting Officer*    *Commissioner of Patents and Trademarks*